United States Patent
Nguyen et al.

(10) Patent No.: US 11,084,388 B2
(45) Date of Patent: Aug. 10, 2021

(54) FAST CHARGING BATTERY PACK AND METHODS TO CHARGE FAST

(71) Applicants: James Nguyen, Palos Verdes Estates, CA (US); Jack Nguyen, San Clemente, CA (US)

(72) Inventors: James Nguyen, Palos Verdes Estates, CA (US); Jack Nguyen, San Clemente, CA (US)

(*) Notice: Subject to any disclaimer, the term of this patent is extended or adjusted under 35 U.S.C. 154(b) by 0 days.

(21) Appl. No.: 17/021,929

(22) Filed: Sep. 15, 2020

(65) Prior Publication Data

US 2020/0406777 A1 Dec. 31, 2020

Related U.S. Application Data

(63) Continuation-in-part of application No. PCT/US2020/040129, filed on Jun. 29, 2020, and a
(Continued)

(51) Int. Cl.
*B60L 53/10* (2019.01)
*B60L 53/62* (2019.01)
(Continued)

(52) U.S. Cl.
CPC .............. *B60L 53/10* (2019.02); *B60L 53/12* (2019.02); *B60L 53/14* (2019.02); *B60L 53/18* (2019.02);
(Continued)

(58) Field of Classification Search
CPC .... H02J 7/007; H02J 2310/22; H02J 2310/48; B60L 53/12; B60L 53/18; B60L 53/35;
(Continued)

(56) References Cited

U.S. PATENT DOCUMENTS

| | | |
|---|---|---|
| 5,631,534 A | 5/1997 | Lewis |
| 5,955,868 A | 9/1999 | Kaite et al. |

(Continued)

FOREIGN PATENT DOCUMENTS

| | | |
|---|---|---|
| CN | 107650718 A | 2/2018 |
| WO | 2013039753 A1 | 3/2013 |

OTHER PUBLICATIONS

International Search Report dated Jun. 12, 2020 from PCT Application No. PCT/US2020/023435.
(Continued)

*Primary Examiner* — Edward Tso
*Assistant Examiner* — Aaron Piggush
(74) *Attorney, Agent, or Firm* — Innovation Capital Law Group, LLP; Vic Lin

(57) ABSTRACT

A fast charging station, battery system and method for charging battery systems can be applied to most battery types in use for electric vehicles (EVs), electronic devices, and wireless electrical machines. The system provides for two or more charging ports in the electronic device, such as an EV, that may be able to receive and recognize a charging type, such as charging voltage, current and the like, and provide directed charging to multiple battery sub-packs that make up the entire battery. By charging sub-packs in parallel, the charge time can be substantially reduced. The system further provides a charging station with two or more electrical connections provided at each stall, providing for fast charge of an electrical device, such as an EV, positioned at each stall.

21 Claims, 32 Drawing Sheets

Related U.S. Application Data continuation-in-part of application No. 16/537,336, filed on Aug. 9, 2019, now Pat. No. 10,790,680.

(60) Provisional application No. 62/868,954, filed on Jun. 30, 2019, provisional application No. 62/862,177, filed on Jun. 17, 2019, provisional application No. 62/847,303, filed on May 13, 2019.

(51) Int. Cl.

| | | |
|---|---|---|
| *H02J 7/00* | (2006.01) | |
| *B60L 53/18* | (2019.01) | |
| *B60L 53/12* | (2019.01) | |
| *B60L 53/35* | (2019.01) | |
| *B60L 53/60* | (2019.01) | |
| *B60L 53/14* | (2019.01) | |

(52) U.S. Cl.
CPC ............... *B60L 53/35* (2019.02); *B60L 53/60* (2019.02); *B60L 53/62* (2019.02); *H02J 7/007* (2013.01); *H02J 2310/22* (2020.01); *H02J 2310/48* (2020.01); *Y02T 90/12* (2013.01); *Y02T 90/14* (2013.01)

(58) Field of Classification Search
CPC .......... B60L 53/62; B60L 53/10; B60L 53/14; B60L 53/60
USPC .................. 320/104, 109, 119, 126, 138
See application file for complete search history.

(56) References Cited

U.S. PATENT DOCUMENTS

| | | | |
|---|---|---|---|
| 8,564,246 | B2 | 10/2013 | Wade et al. |
| 9,783,020 | B2 | 10/2017 | Chuang |
| 2008/0203974 | A1 | 8/2008 | Manai et al. |
| 2010/0045242 | A1 | 2/2010 | Nagashima et al. |
| 2011/0144823 | A1 | 6/2011 | Muller et al. |
| 2011/0170318 | A1 | 7/2011 | Chen |
| 2011/0254503 | A1 | 10/2011 | Widmer et al. |
| 2011/0313603 | A1* | 12/2011 | Laberteaux ............. B60L 53/64 701/22 |
| 2012/0013303 | A1 | 1/2012 | Mera |
| 2012/0091955 | A1 | 4/2012 | Gao |
| 2012/0161702 | A1 | 6/2012 | Kim |
| 2013/0076902 | A1 | 3/2013 | Gao et al. |
| 2014/0009120 | A1 | 1/2014 | Kim |
| 2014/0266042 | A1 | 9/2014 | Storm |
| 2014/0347017 | A1* | 11/2014 | Sugano ................ B60L 53/122 320/137 |
| 2015/0008867 | A1 | 1/2015 | Smychkovich |
| 2015/0115891 | A1 | 4/2015 | Sung et al. |
| 2016/0049810 | A1 | 2/2016 | Armstrong |
| 2016/0193932 | A1 | 7/2016 | Vaghefinazari |
| 2016/0214484 | A1 | 7/2016 | Gale et al. |
| 2016/0226266 | A1 | 8/2016 | Huang |
| 2017/0054134 | A1 | 2/2017 | Choi et al. |
| 2018/0229613 | A1* | 8/2018 | Rajaie ..................... B60L 53/11 |
| 2019/0103750 | A1 | 4/2019 | Kristensen |
| 2019/0148954 | A1 | 5/2019 | Jeong et al. |
| 2019/0225096 | A1* | 7/2019 | Hiroe ..................... B60L 53/22 |
| 2020/0062138 | A1* | 2/2020 | Smolenaers ............ B60L 53/24 |
| 2021/0155100 | A1* | 5/2021 | Khaligh ................ B60L 53/22 |

OTHER PUBLICATIONS

International Search Report & Written Opinion dated Dec. 10, 2020 from PCT Application No. PCT/US2020/050867.

International Search Report & Written Opinion dated Sep. 30, 2020 from PCT Application No. PCT/US2020/040129.

* cited by examiner ions of the invention relate generally to battery
FAST CHARGING BATTERY PACK AND METHODS TO CHARGE FAST

CROSS-REFERENCE TO RELATED APPLICATIONS

This application is a continuation-in-part of U.S. patent application Ser. No. 16/537,336, filed Aug. 9, 2019, which claims the benefit of priority of U.S. provisional patent application No. 62/847,303, filed May 13, 2019, U.S. provisional patent application No. 62/862,177, filed Jun. 17, 2019, and U.S. provisional patent application No. 62/868,954, filed Jun. 30, 2019, the contents of each of which are herein incorporated by reference in their entirety.

BACKGROUND OF THE INVENTION

1. Field of the Invention

Embodiments of the invention relate generally to battery power systems and related methods. More particularly, embodiments of the invention relate to a fast charging battery pack and methods for charging battery packs in a rapid manner. The battery packs may be used, for example, in electric vehicles, electronic devices, wireless electrical machines and the like.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The high power density and long cycle life of lithium-ion cells have made them broadly employed in electrical/mechanical systems such as electric vehicles (EV), mobile devices such as tablets and smartphones, and wireless electrical machines such as hand drills and lawn mowers. For example, Tesla S 85D vehicle is built with a battery pack consisting of 7,104 Lithium-ion cells. Fast charging of battery cells has always been the goal to improve the system operation availability. Various fast charging technologies have been implemented, significantly reducing the time to charge the cells. However, the cost and complexity of state-of-the-art fast charging battery systems (e.g., DC Fast Charge for EVs) are still relatively high in comparison to standard charging technologies (e.g., 120V & 240V AC charging) that may take many hours to fully charge cells.

Referring to FIGS. 1A and 1B, schematic diagrams of an exemplary EV battery pack 100 having sixteen modules 112 and equipped with one charge port 102 is shown. The modules 12 are divided into four sub-packs 110, each having four modules 112. A power management device 104 and battery management system (BMS) 106 may be connected as known in the art. In FIG. 1A, the modules 112 may be connected in series, while in FIG. 1B, the sub-packs 110 may be connected in parallel, while the modules 112 within each sub-pack 110 are connected in series. In some embodiments, a DC-DC converter 108 may be used to ensure each sub-pack 110 outputs the same voltage.

As such, it is desirable to have a fast charging battery system and methods that are lower in cost and complexity than current state-of-the-art fast charging technologies. Such a system could be applied to most battery types in use for EVs, electronic devices, and wireless electrical machines. The concept would employ industry proven battery charger systems and off-the-shelf electrical components (e.g., contactors, relay switches, semiconductor parts, DC-DC converters, and the like) to keep cost and complexity low.

SUMMARY OF THE INVENTION

In one embodiment, the EV can be equipped with multiple charge ports and when two or more of the provided ports are selectively used simultaneously to recharge the EV battery, the time required to reach full charge is reduced. The power management (PM) system has options, for example, if only one charge plug is plugged in, the system recognizes the input and delivers the appropriate charging current to the entire battery pack, and, if two or more ports are connected, the power can flow, in parallel, to separate modules to charge them simultaneously, thus reducing overall charging time.

In another embodiment, the multiple charge ports equipped on the EV can be compatible with various types of charge plugs (e.g., Level 1, Level 2, DC fast charging, and the like) and the same type or different type of charge plugs may be selectively used at the same time to recharge the EV battery pack. The power management system has options to recognize the input plug type and delivers the appropriate charging current to the entire battery pack (comprising separate modules) when one port is connected, and if two or more ports are connected, the appropriate power can flow, in parallel, to separate modules to charge them simultaneously, thus reducing overall charging time.

In some embodiments, all the separate battery charger units employed may start and stop their respective charging cycle at the same time as one another; or any combination of the battery charger units employed may start and stop their respective charging cycle at a different time relative to one another.

In another embodiment, during battery pack normal discharge usage, any of the modules may be reconfigured by the power management system to be electrically disconnected from the battery pack as deemed desirable for improved operation of the battery pack and/or the vehicle or device equipped with said battery pack.

In another embodiment, the charging station has multiple charge outlets (e.g., cords and plugs of one type—Level 1, Level 2, DC fast charging, and the like—and/or different types; pantograph charging systems; wireless charging systems) to facilitate service to each individual EV equipped with two or more charge ports. Existing public EV charging stations may have multiple charge plug types (e.g., one Level 2 and one DC Fast Charge) for each stall, however, only one of the plugs can be used at a time. An individual charging station typically can service two or more stalls, so one charge plug from each stall can be used to charge an EV having multiple charge ports. However, this would cause a problem for another EV arriving at the unoccupied stall to find that its charge plug is already being used. Embodiments of the present invention propose a solution to this problem, where the charging station can provide power to multiple lines at each stall, for each EV.

In some embodiments, multiple charge cords/plugs for Level 1, Level 2, and DC fast charging types may be combined into one unit or are presented as separate units.

In some embodiments, multiple charge cords may be combined into a single unit, where the single unit can include multiple male plugs on one end thereof, such as multiple 120V plugs, multiple 240V plugs, or the like. On the opposite end, the single unit can include a specialized plug, or a standard EV plug, adapted to deliver power supplied on each of the charge cords to multiple on-board chargers, permitting charging of the sub-packs of an EV battery in parallel. This results in multiple charge cords being provided in a more organized, bundled manner, thereby minimizing a tangled mess and safety hazard for this specific application.

In another embodiment, the EV may have two or more AC chargers on-board to enable the use of multiple AC charge plugs (e.g., Level 1 and/or Level 2) simultaneously. Alternatively, the EV may have only one AC charger on-board and any additional AC charge plugs used would employ AC chargers not equipped on the EV since they undesirably take up space and add weight to the EV.

In another embodiment, with two or more chargers plugged in, the EV can accept a predetermined length of charge time input by the user and proceed to optimize the charging process to get the most amount of charge to the battery pack, for the given length of time, with the specific plug types being used (e.g., two Level 2 plugs and one Level 1 plug), while ensuring the individual modules have equal voltage at the end of the charge time to sustain long-term battery pack life.

In another embodiment, with multiple charge plugs used for charging, if the charge process is ended while some of the individual battery modules have not reached full state of charge and their voltage is less than the voltage of the main battery pack, then the individual battery modules may be kept electrically unconnected to the main battery pack until the voltage of the modules and the main battery pack are at an equal state of charge.

In some embodiments, all the individual battery modules may have direct electrical connection to negative ground, or alternatively, may be electrically connected to negative ground via a switch which can optionally be set to electrically disconnect the respective individual battery modules from negative ground.

In another embodiment, the user may optionally set the EV (with multiple charge plugs connected for fast charging) to be able to reduce the fast rate of charge so as to not incur a higher cost levied at specific time of day for the large amount of electricity power consumed during the charging period.

In practice, the home owner or public charging station may need to draw power from an electrical energy storage system (e.g., Tesla Powerwall battery, Tesla Powerpack battery, or the like) because the electrical grid may not able to deliver the large amount of power needed to fast charge multiple EVs at the same time. The Powerwall/Powerpack battery would serve to provide local reserve power, and a buffer for the electrical grid, to meet the power spike in usage demand when multiple EVs are charging concurrently. The Powerwall/Powerpack battery may be recharged via the electrical grid at an acceptable rate of power consumption while the EVs are being charged and/or when no EVs are being charged. Therefore, in some embodiments, power can be provided to the battery of the EV by an electrical energy storage system. In some embodiments, the electrical energy storage system is operable to be recharged via the electrical grid at an acceptable rate of power consumption while one or more EVs are being charged or when no EVs are being charged.

Embodiments of the invention may include various steps as set forth above. The steps may be embodied in machine-executable instructions which cause a general-purpose or special-purpose processor to perform certain steps. Various elements which are not relevant to the underlying principles of the invention such as computer memory, hard drive, input devices, have been left out of the figures to avoid obscuring the pertinent aspects of the invention.

Alternatively, in one embodiment, the various functional modules illustrated herein, and the associated steps may be performed by specific hardware components that contain hardwired logic for performing the steps, such as an application-specific integrated circuit ("ASIC") or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server, a cloud service) to a requesting computer (e.g., a client) by way of data signals embodied in a carrier wave or other propagation medium via a communication link (e.g., a modem or network connection, Wi-Fi or other wireless means). The computer program may be used to allow a user control of, and/or to monitor the battery and the charging process.

Embodiments of the present invention provide a battery charging system comprising at least two ports for receiving charging power; at least two battery sub-packs; a power manager detecting at least one detected port, from the at least two ports, receiving charging power; and a plurality of switches configured to provide power from the at least one detected port to each of the at least two battery sub-packs, wherein when the at least one detected port is a first detected port and a second detected port, at least two of the at least two battery sub-packs are charged in parallel from the first detected port and the second detected port.

In some embodiments, the at least one detected port receiving charging power includes at least a first detected port and a second detected port.

In some embodiments, the plurality of switches alternate the system between a first phase and at least a second phase, wherein the first phase connects selected ones of the first and second detected ports to a first selection of the at least two battery sub-packs and the second phase connects selected ones of the first and second detected ports to a second selection of the at least two battery sub-packs, where the first selection is different from the second selection.

In some embodiments, the switching between the first phase and at least the second phase provides substantially even charging between the at least two battery sub-packs.

Embodiments of the present invention further provide a battery charging system comprising at least four ports for receiving charging power; at least four battery sub-packs; a power manager detecting at least one detected port, from the at least four ports, receiving charging power; and a plurality of switches configured to provide power from the at least one detected port to each of the at least four battery sub-packs, wherein when the at least one detected port is at least a first detected port and a second detected port, at least two of the at least four battery sub-packs are charged in parallel from the first detected port and the second detected port.

Embodiments of the present invention also provide a method of charging a battery with a battery charging system comprising separating the battery into at least two battery sub-packs; detecting whether power is provided at each of at least two charging ports; switching one or more of a plurality of switches to provide power that is received at one or more of the at least two charging ports to the at least two battery sub-packs; and when more than one of the at least two charging ports receive power, charging at least a first and a second one of the at least two battery sub-packs in parallel with each of the at least two charging ports receiving power.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1A:
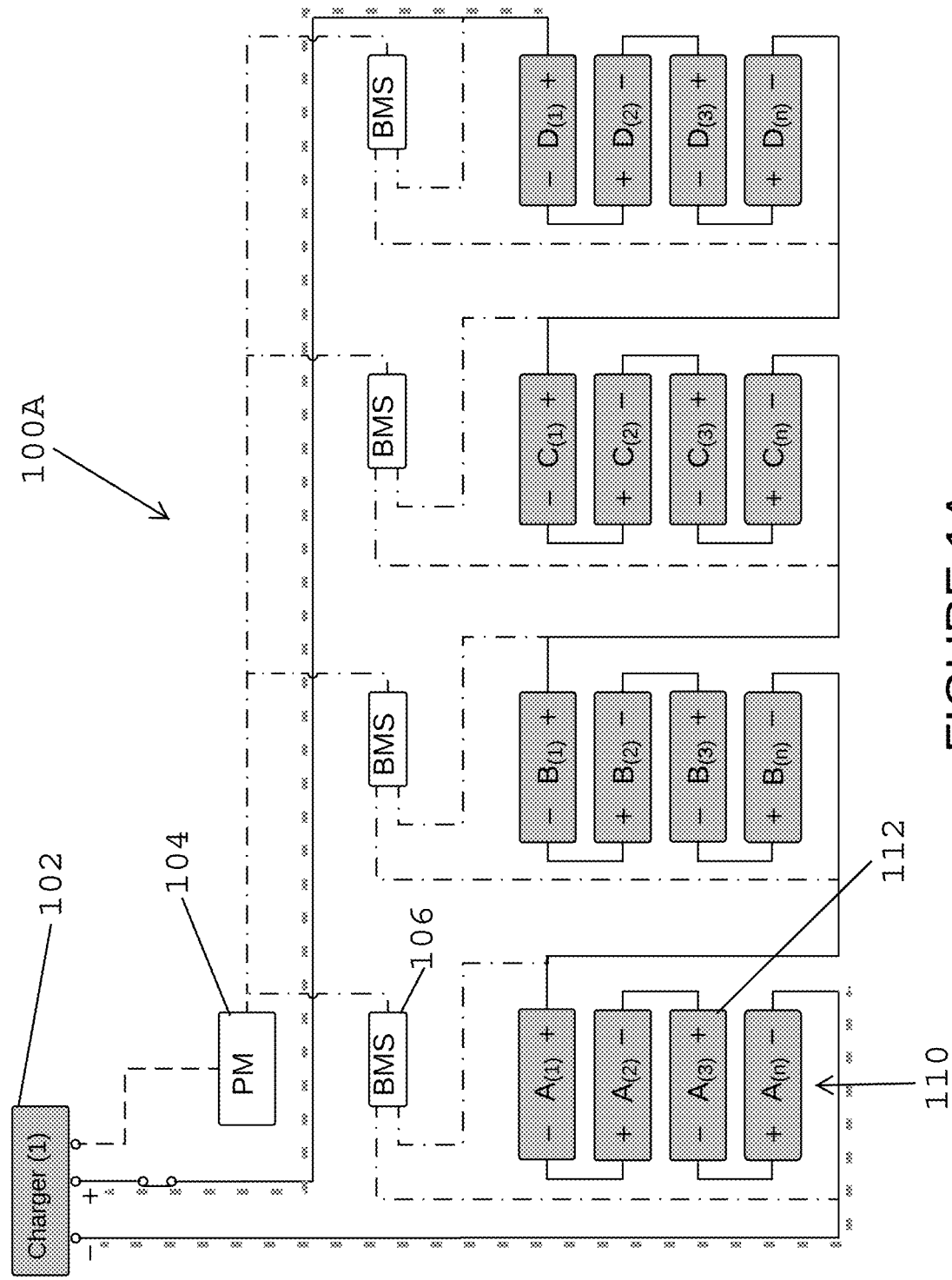
FIG. 1A illustrates a conventional simplified schematic diagram of an exemplary EV battery pack having 16 modules, series connected, and equipped with one charge port.
Figure 1B:
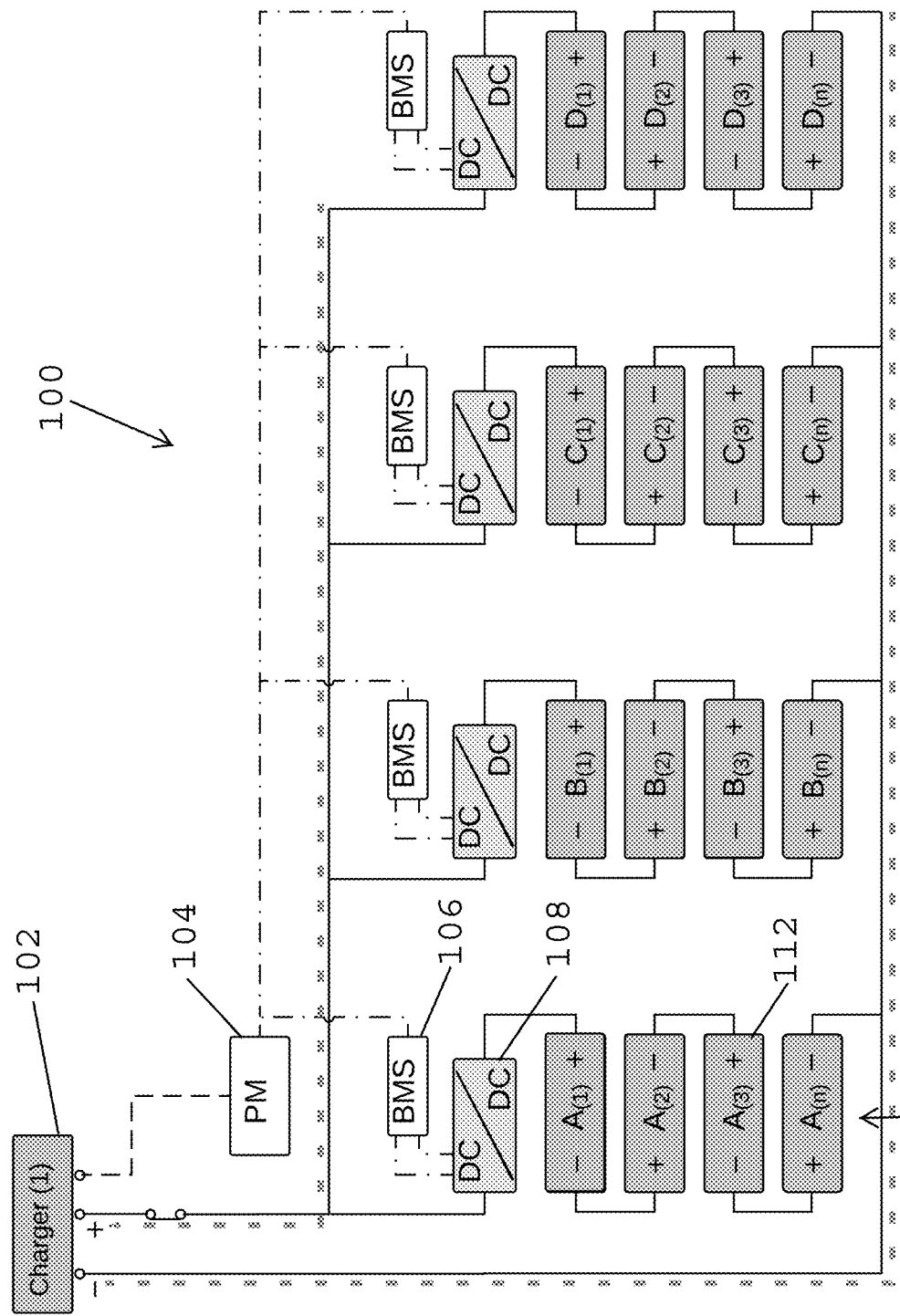
FIG. 1B illustrates a conventional simplified schematic diagram of an exemplary EV battery pack having 16 modules, series and parallel connected, and equipped with one charge port.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a fast charging battery system and methods that are lower in cost and complexity than current state-of-the-art fast charging technologies. The system can be applied to most battery types in use for electric vehicles (EVs), electronic devices, and wireless electrical machines. The system could employ industry proven battery charger systems and off-the-shelf electrical components (e.g., contactors, relay switches, semiconductor parts, DC-DC converters, and the like) to keep cost and complexity low. The system provides for two or more charging ports that may be able to receive and recognize a charging type and provide charging to multiple battery sub-packs that make up the entire battery. By charging sub-packs in parallel, the charge time can be substantially reduced.

The embodiments discussed below include devices, such as electric vehicles, that have two charge ports (FIG. 2A through FIG. 2D) and devices that have four charge ports (FIG. 3 through FIG. 12D). The system of the present invention may be usable with Level 1 charging (120V charging, typically 12-20 Amp) and Level 2 charging (240V charging, typically 12-80 Amp). When the system detects multiple charging connection at its multiple ports, the system can determine the incoming voltage, and thus, the Level of the charging connection. When the same Level is provided, the system can charge the sub-packs in parallel, as discussed below, to reduce charge times. When different Level of charging connections are provided, the system can provide one of the Levels to at least one sub-pack, and the other Level to at least one of the other sub-packs. As the charging continues, the system can switch which Levels charge which packs to ensure even charging therebetween.

Each of the FIGS. 2A through 12D are shown with four sub-packs, each having four modules. It should be understood that different sizes of batteries, different number of sub-packs, and different number of modules per sub-pack may be used within the scope of the present invention. Of course, for a device, such as an EV, having two charge ports, at least two sub-packs are required to take advantage of the features of the present invention. Similarly, for a device having four charge ports, at least two sub-packs, and typically at least four sub-packs, are required to take advantage of the features of the present invention.

Referring to FIGS. 2A through 2D, when the device, such as an EV, has two charge ports 12A, 12B, the system 10 can be configured to accept power from one or both of the ports 12A, 12B. The embodiment of FIGS. 2A through 2D includes a first switch S1 connected to the positive terminal of the port 12A, a second switch S2 connected to the positive terminal of the port 12B, a third switch S3 interconnecting the output of S1 and S2, and a fourth switch S4 that can isolate or connect the negative terminals of each of the ports 12A, 12B.

Figure 2A:
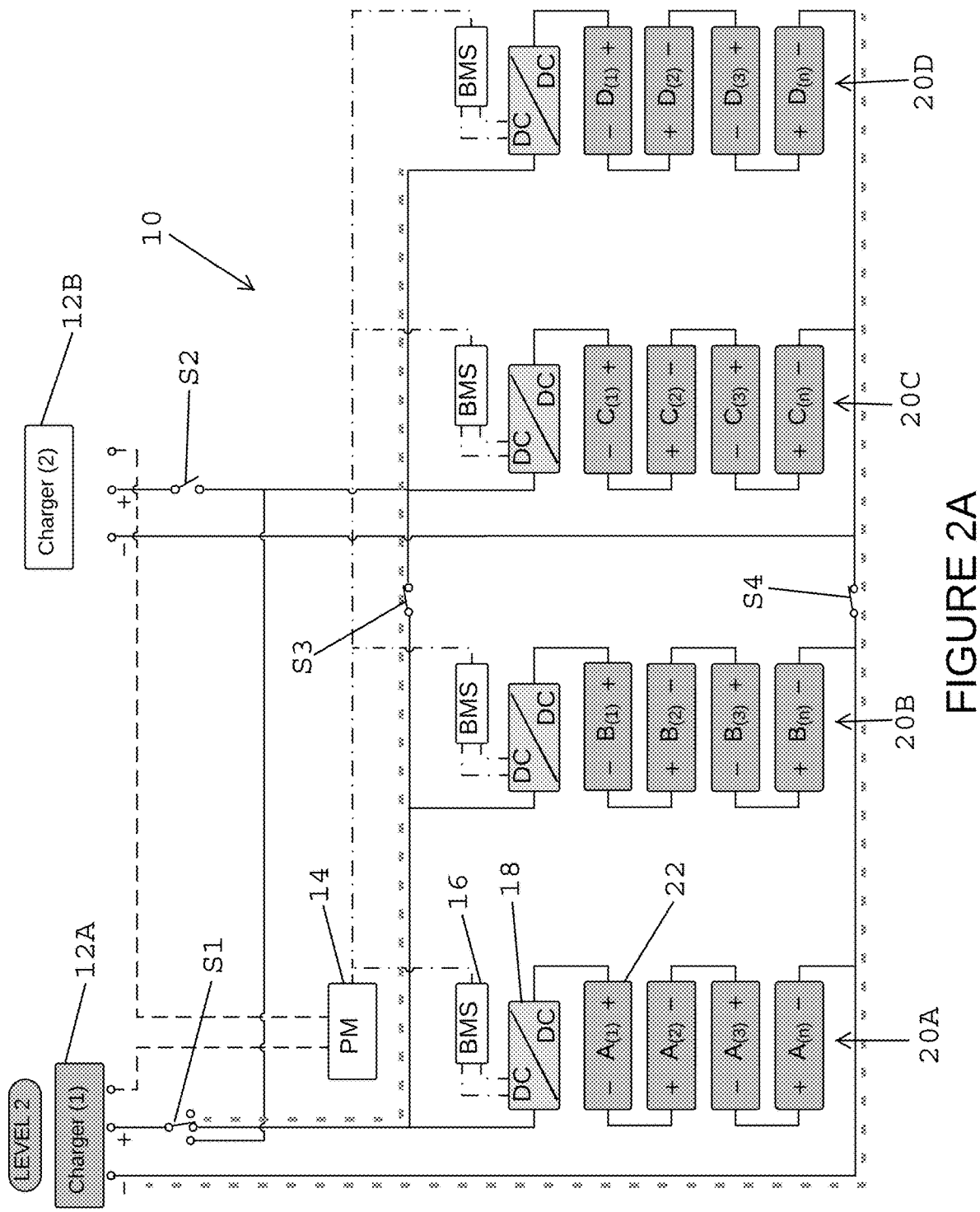
FIG. 2A illustrates a simplified schematic diagram of an exemplary EV battery pack having 16 modules, series and parallel connected, and equipped with 2 charge ports with one charger selectively connected as shown.

In FIG. 2A, one Level 2 charging connection is connected to port 12A. The result is similar to conventional charging, where power from the port 12A is delivered to each of the sub-packs 20A-20D in parallel, where each of the modules 22 of each sub-pack 20A-20D is charged in series. When port 12A is provided with charging power, S1 can be closed to provide power to first and second sub-packs 20A, 20B and S3 can be closed to provide power to the third and fourth sub-packs 20C, 20D. Switch S3 may be open to prevent back feeding the charge port 12B.

Figure 2B:
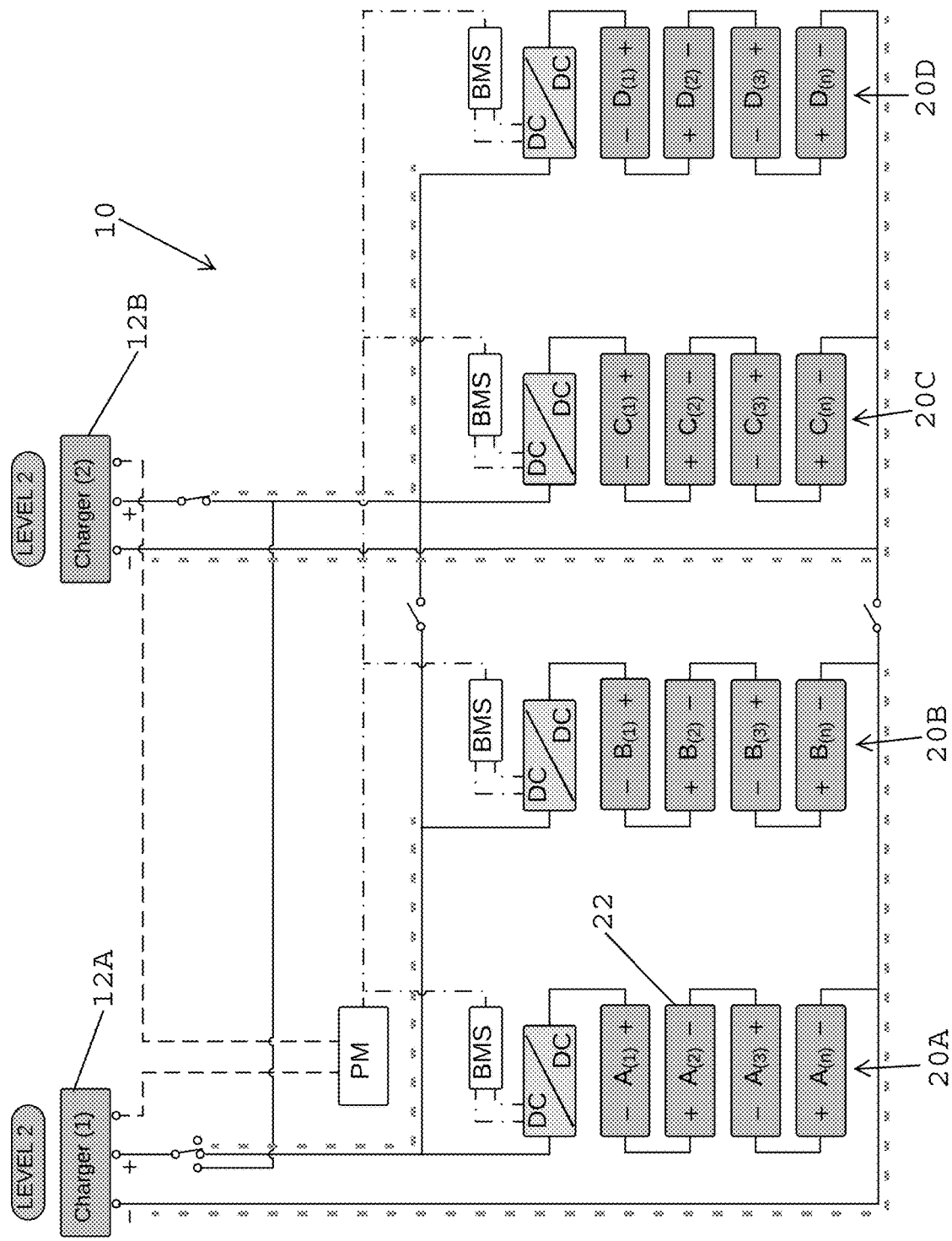
FIG. 2B illustrates the simplified schematic diagram of FIG. 2A with both chargers of the same type (Level 2) selectively connected as shown.

In FIG. 2B, a Level 2 charging connection may be provided to port 12A and to port 12B. This embodiment differs from that of FIG. 2A in that switch S3 may be open so that power from each port 12A, 12B can charge sub-packs 20A and 20B, and sub-packs 20C and 20D, respectively. Thus, the charging time for the embodiment of FIG. 2B may be about half that of FIG. 2A, with the battery being split into half, with each half being charged in parallel.

Figure 2C:
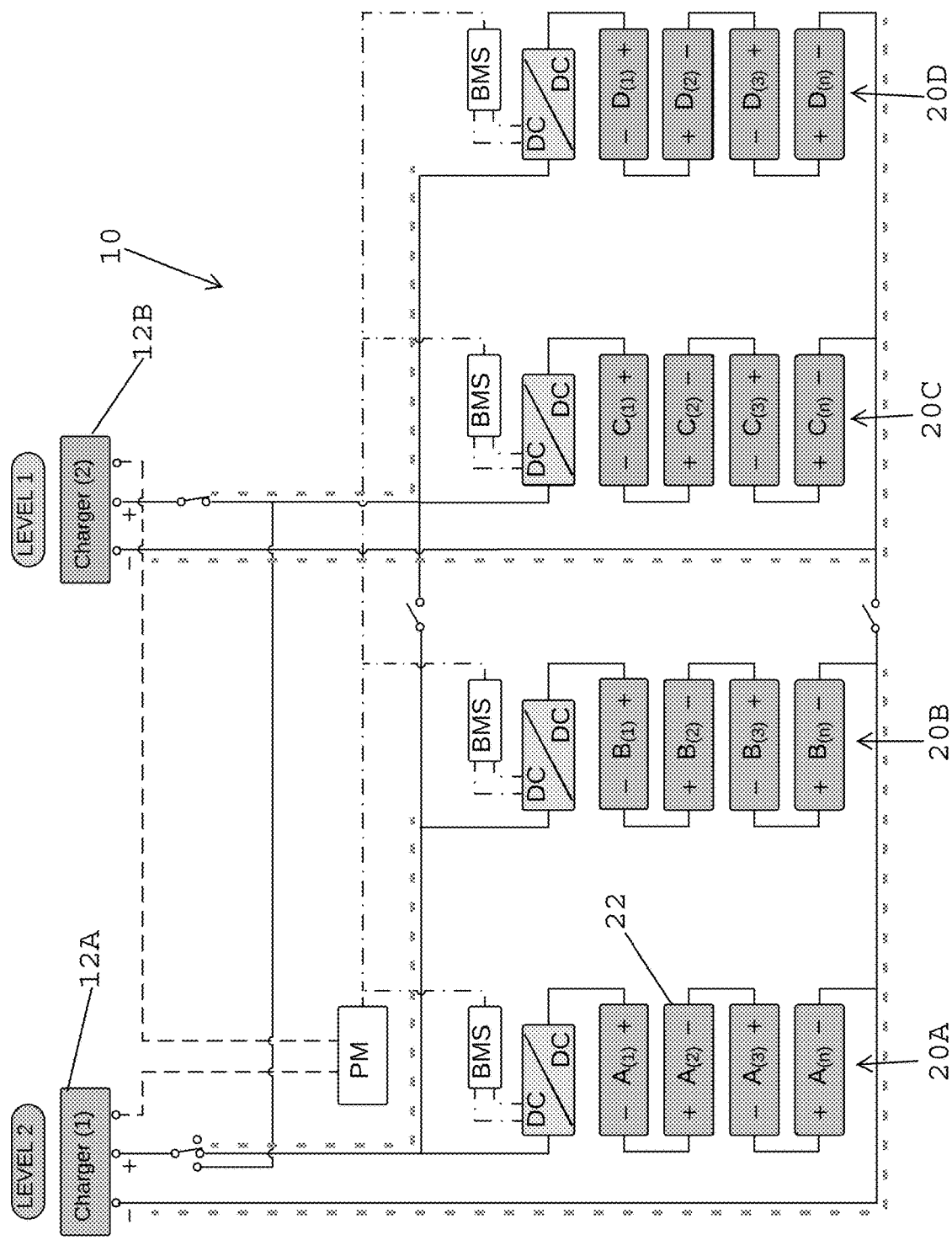
FIG. 2C illustrates the simplified schematic diagram of FIG. 2A with both chargers selectively connected as shown for Phase A of the charge cycle, where each charger is a different type (Level 2 and Level 1)
Figure 2D:
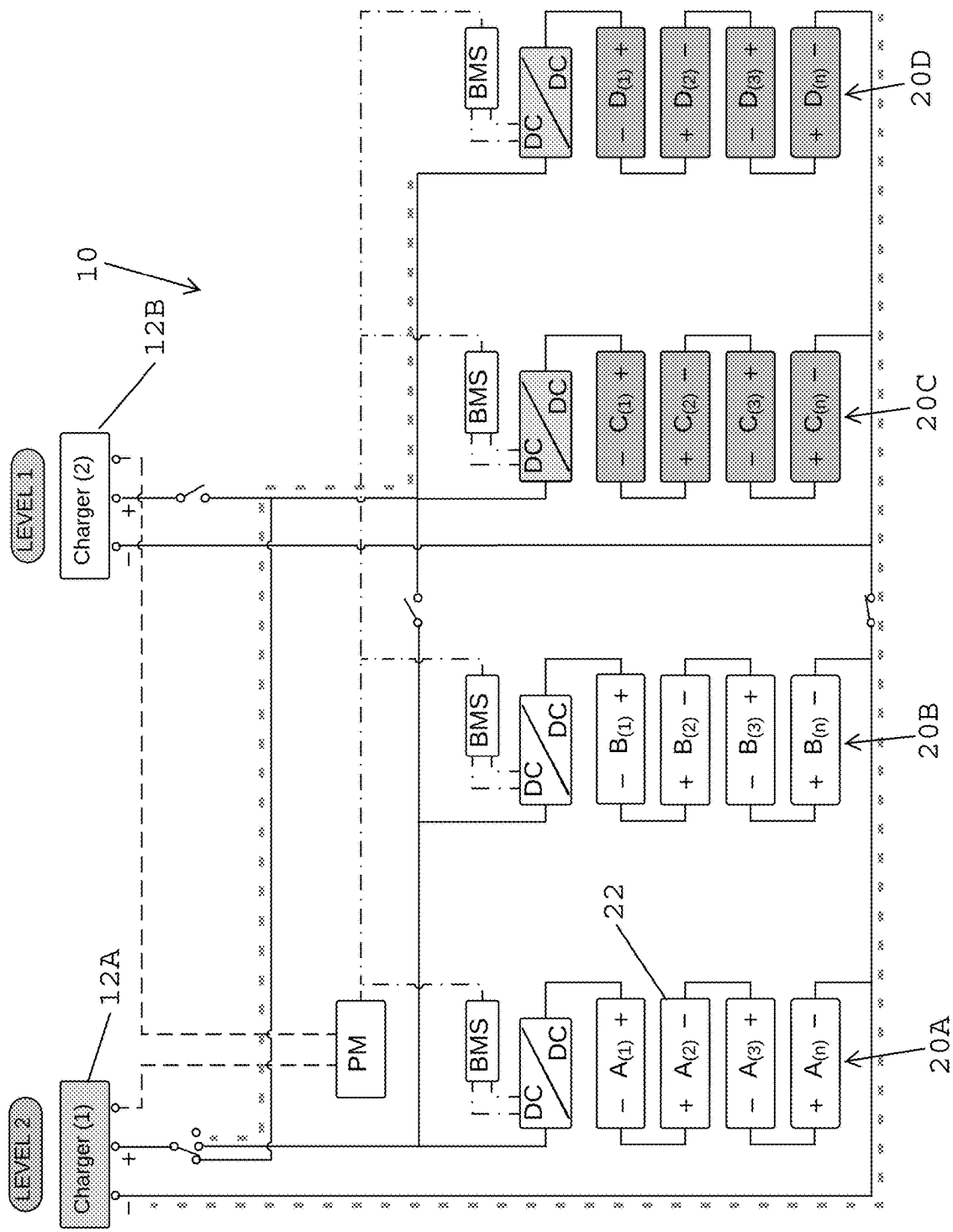
FIG. 2D illustrates the simplified schematic diagram of FIG. 2A with both chargers selectively connected as shown for Phase B of the charge cycle, where each charger is a different type (Level 2 and Level 1)

In FIGS. 2C and 2D, it is illustrated how the system 10 can be used to control charging of the sub-packs 20A-20D when different Level charging connections are provided to the two ports 12A, 12B. In this example, a Level 2 charging connection is provided to port 12A and a Level 1 charging connection is provided to port 12B. In FIG. 2C, a first charge phase, referred to as phase A provides the Level 2 charging connection to sub-packs 20A, 20B and provides the Level 1 charging to sub-packs 20C and 20D. Once a predetermined charge level is reached, or after a predetermined time, the switches S1, S2, S3, S4 may change to provide Phase B, as shown in FIG. 2D. Here, the Level 2 charging is provided to sub-packs 20C and 20D to "catch-up" the charge level in these sub-packs 20C, 20D to meet or exceed that already provided in sub-packs 20A and 20B. In Phase B, as shown in FIG. 2D, port 12B is shown as being disconnected. However, in some embodiments, switch S2 may have two selective outputs, similar to switch S1, where, during phase B, power (Level 1) from port 12B may be provided to sub-packs 20A and 20B in a manner similar to how power from port 12A is provided to sub-packs 20C and 20D.

In this embodiment, the power manager 14, the battery management system 16 and the DC-DC converters 18 may be used to ensure that each sub-pack is charged to the same state of charge. Should charging be interrupted where one or more of the sub-packs are charged to a lower state of charge, the DC-DC converters 18 can be used to ensure a uniform output from each of the sub-packs 20A-20D.

Figure 3:
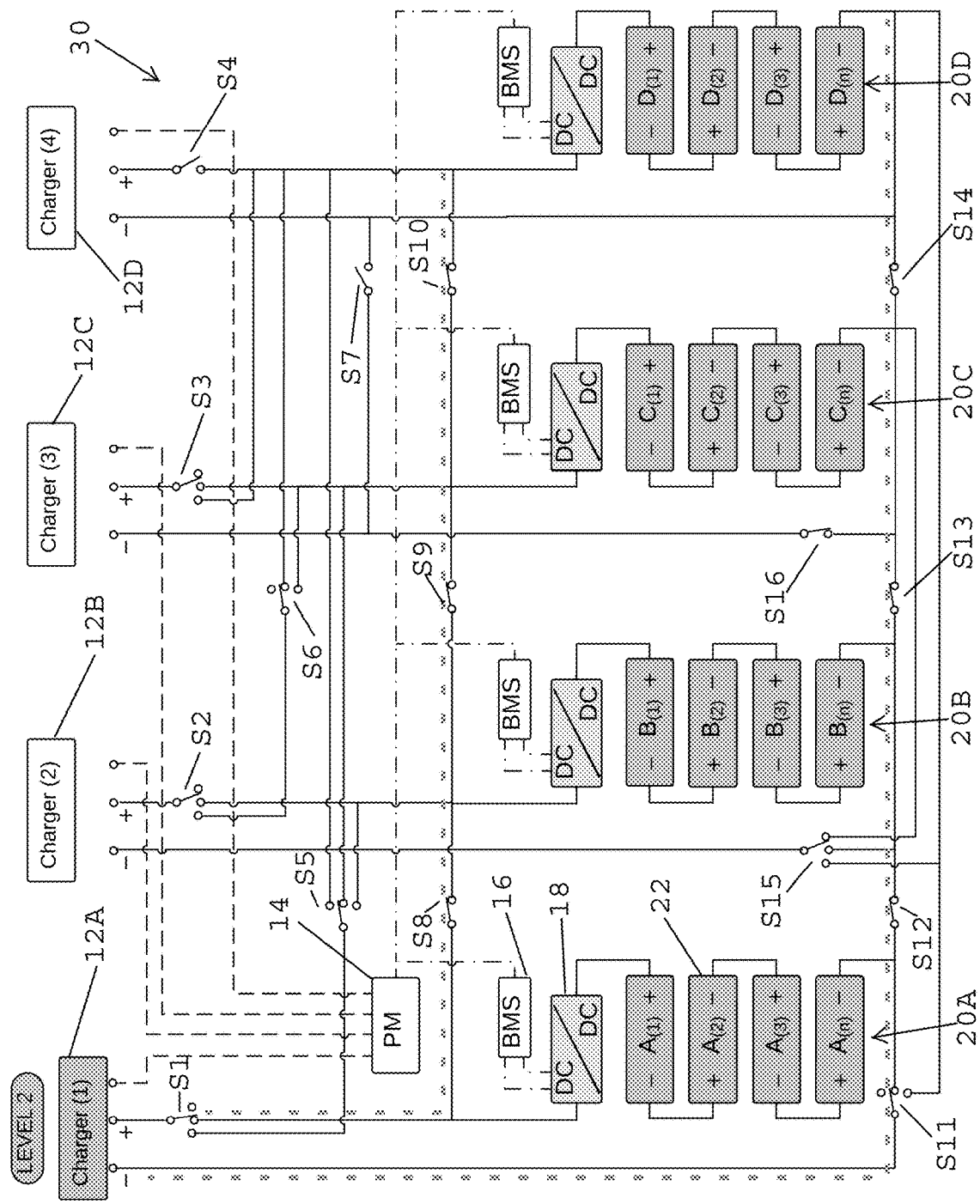
FIG. 3 illustrates a simplified schematic diagram of an exemplary EV battery pack having 16 modules, series and parallel connected, and equipped with 4 charge ports with one charger selectively connected as shown.
Figure 4:
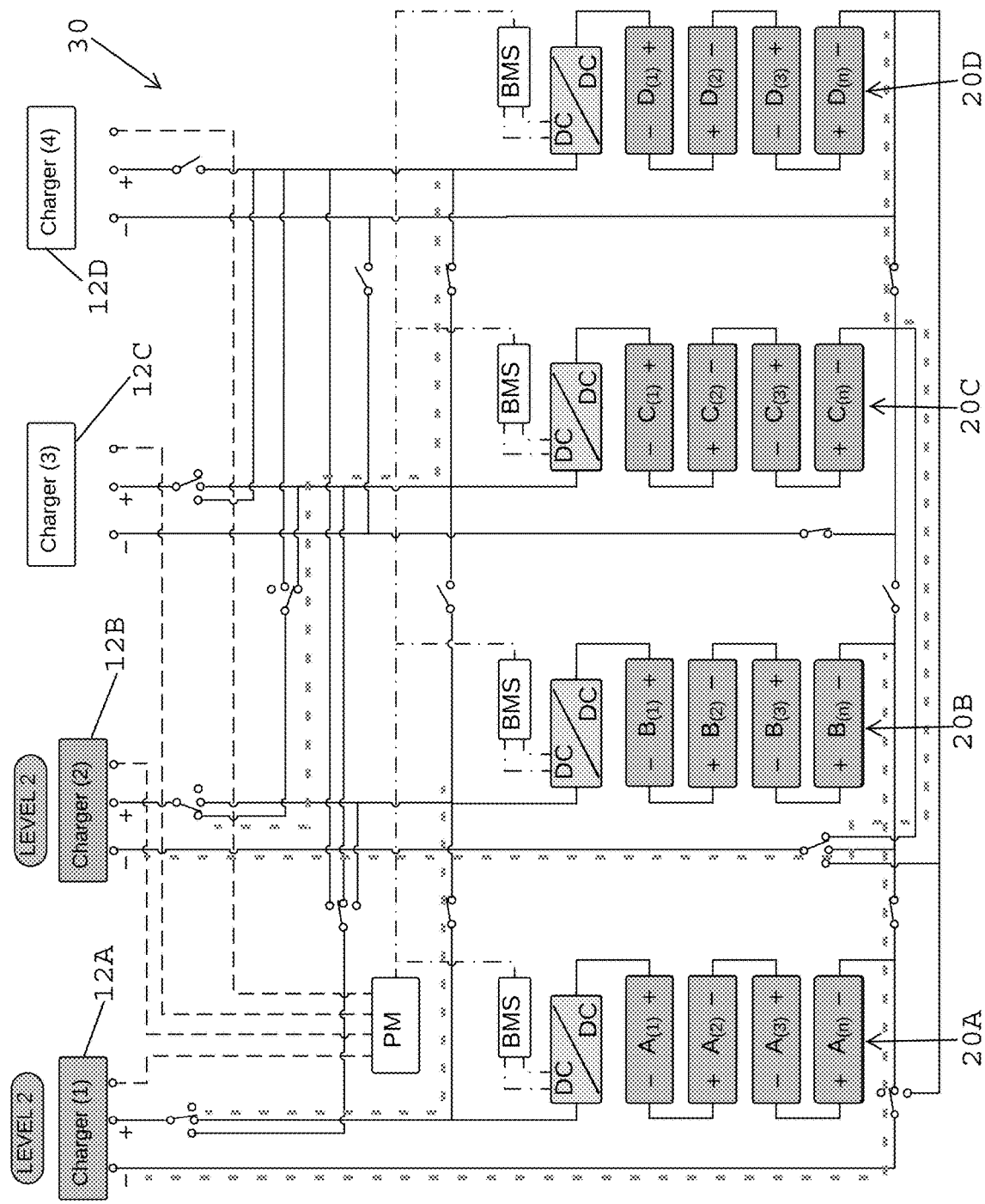
FIG. 4 illustrates the simplified schematic diagram of FIG. 3 with two chargers of the same type (Level 2) selectively connected as shown.
Figure 5A:
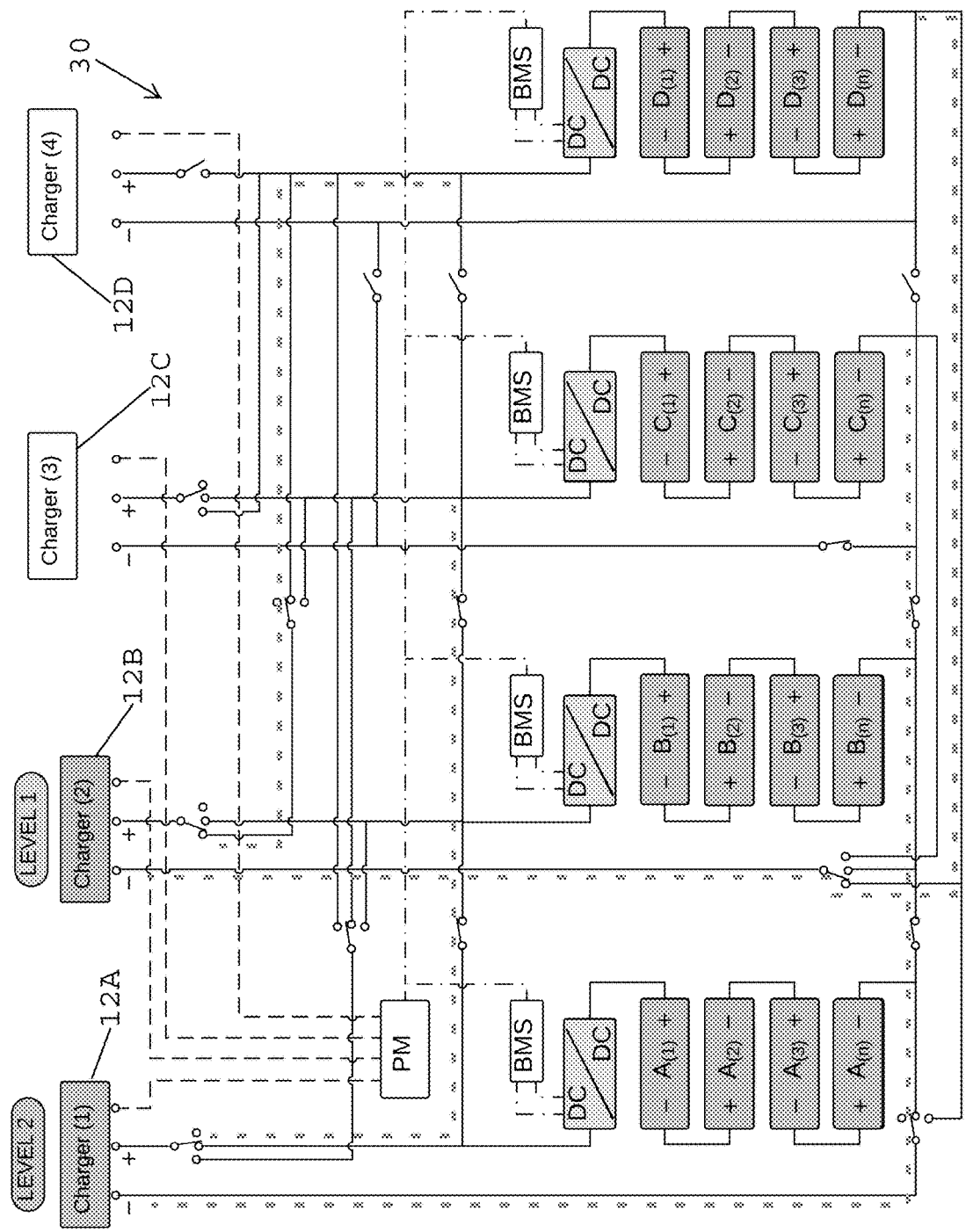
FIG. 5A illustrates the simplified schematic diagram of FIG. 3 with two chargers selectively connected as shown for Phase A of the charge cycle, where each charger is a different type (Level 2 and Level 1)
Figure 5B:
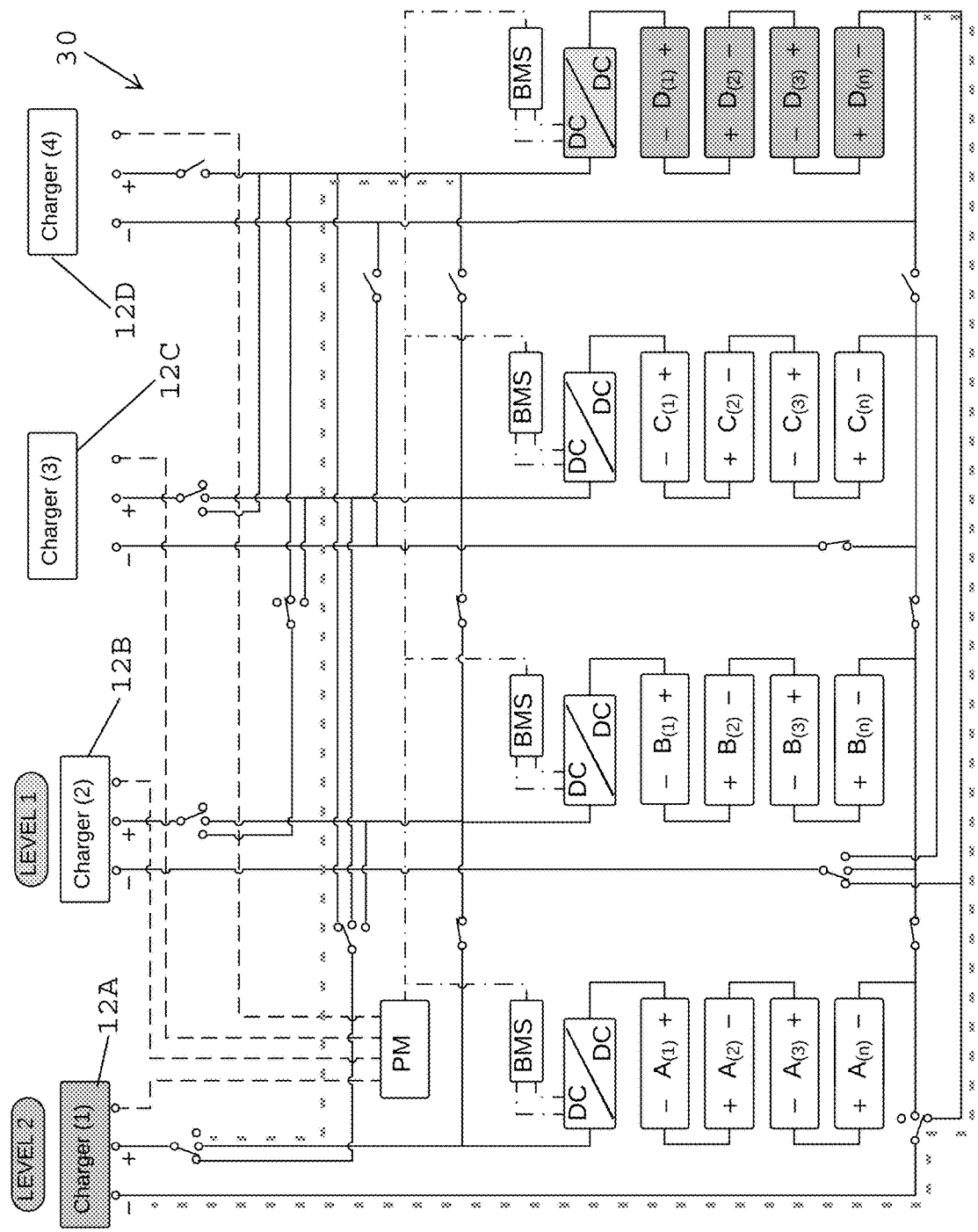
FIG. 5B illustrates the simplified schematic diagram of FIG. 5A with two chargers selectively connected as shown for Phase B of the charge cycle.

FIGS. 3 through 12D provide examples where the device, such as an EV, includes four ports 12A-12D. FIG. 3 provides an example where one port is connected to power, FIGS. 4 through 5B provide examples where two ports are connected to power, FIGS. 6A through 8C provide examples where three ports are connected to power, and FIGS. 9A through 12D provide examples where all four ports are connected to power. The system architecture of FIG. 3 is substantively the same as that used in all of FIGS. 3 through 12D, with the difference being the ports being connected to power. Therefore, reference numbers provided in FIG. 3 may be absent from FIGS. 4 through 12D, for clarity purposes, however, like structures refer to like elements in each of FIGS. 3 through 12D.

Referring now to FIG. 3, when a single power source, such as a Level 2 power connection, is provided to port 12A, the power manager 14 can control switches S1 through S16 so that the positive line from port 12A is connected to each of the sub-packs 20A through 20D and the negative line from port 12A is connected to each of the sub-packs 20A through 20D. In the embodiment shown in FIG. 3, each of the modules 22 in the sub-packs 20A through 20D are charged in series, while the individual sub-packs 20A through 20D are charged in parallel. Of course, the individual modules 22 in each sub-pack 20A through 20D may be connected in various manners, such as all in series, as shown, all in parallel, or a combination of modules 22 in series and parallel. Typically, each sub-pack 20A through 20D will have the same power rating (Amp-hours). However, should a single module 22 fail, the battery management system 16, in conjunction with the DC-DC converter 18 may be used to optimize the output of each of the sub-packs 20A through 20D.

The system of FIG. 3 may be similar to conventional charging systems, with the exception that other power ports 12B, 12C, 12D are provided to provide additional power input that, with the appropriate selection by switches S1 through S16, can provide charging in a manner that is up to four times faster than the charging scheme of FIG. 3.

In FIG. 4, two power connections, that are the same, such as two Level 2 power connections, may be provided to ports 12A, 12B. In this embodiments, port 12A can provide power to half of the battery, such as sub-packs 20A, 20B, while port 12B can provide power to the other half of the battery, such as sub-packs 20C, 20D. Each half of the battery may be charged in parallel from each port 12A, 12B. This can result in a charging time that is half that of the charging time shown in FIG. 3.

Referring now to FIGS. 5A and 5B, when the charging power supplied to ports 12A, 12B is different, such as a Level 2 power connection to port 12A and a Level 1 power connection to port 12B, a switching mechanism, such as that shown in FIGS. 2C and 2D may be provided, where the charging system 30 can operate in Phase A (FIG. 5A) and Phase B (FIG. 5B), where the system can switch between Phase A and B so that each sub-pack 20A, 20B, 20C, 20D charges to substantially the same state of charge. In this embodiment, Phase A may provide Level 2 power to sub-packs 20A and 20B, while Level 1 power is supplied to sub-packs 20C and 20D. In Phase B, Level 2 power may be supplied to sub-packs 20C and 20D. The switching between Phases can occur to keep the state of charge between each half of the battery (that is between sub-packs 20A, 20B and sub-packs 20C, 20D) substantially the same.

FIGS. 6A through 8C provide examples where three chargers may be connected to ports 12A, 12B and 12C.

Figure 6A:
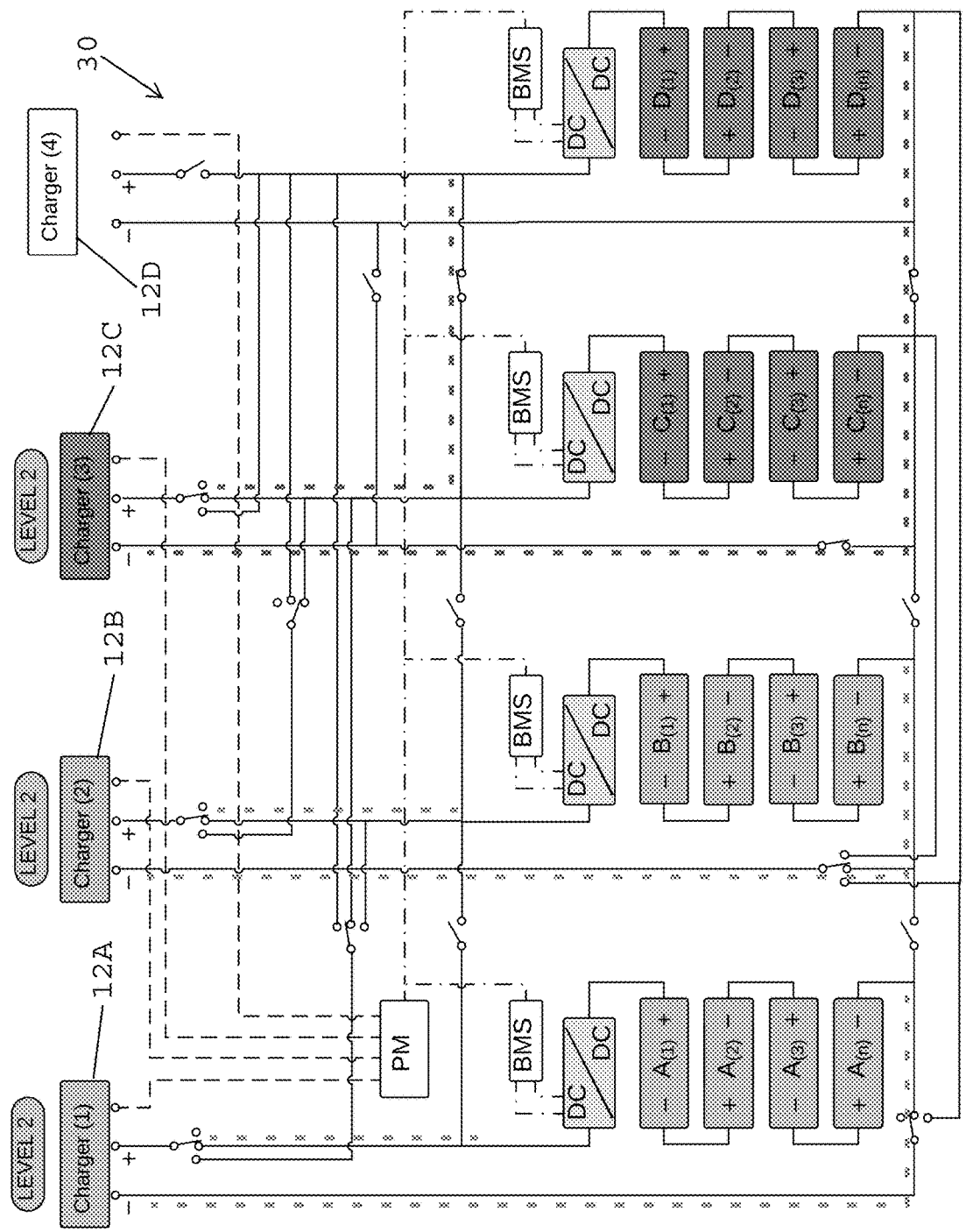
FIG. 6A illustrates the simplified schematic diagram of FIG. 3 with three chargers selectively connected as shown for Phase A of the charge cycle, where each charger is the same type (Level 2)
Figure 6B:
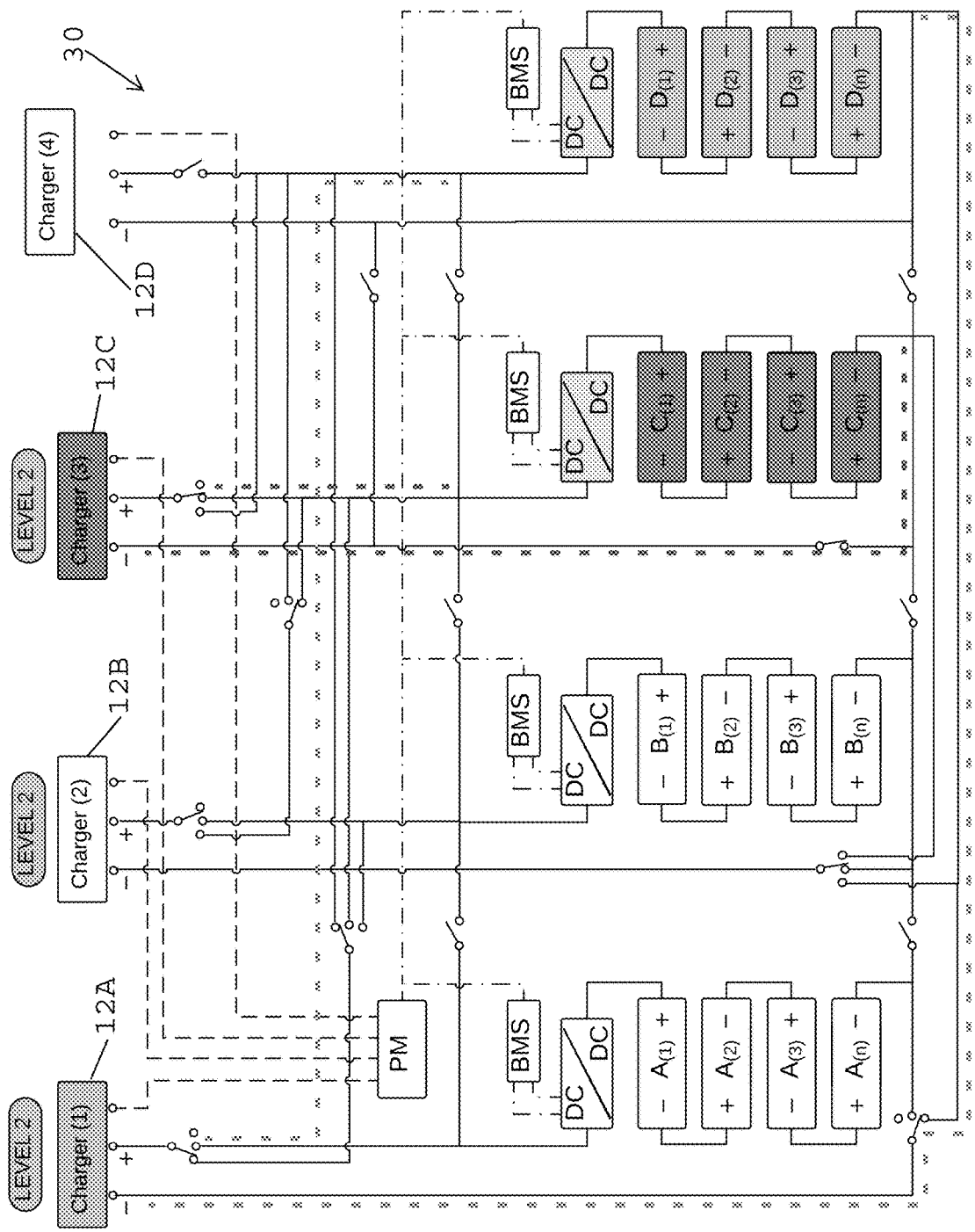
FIG. 6B illustrates the simplified schematic diagram of FIG. 6A with three chargers selectively connected as shown for Phase B of the charge cycle.

Referring to FIGS. 6A and 6B, three chargers may be connected each to ports 12A, 12B, 12C. In this embodiment, like that of FIG. 4, each port 12A, 12B, 12C may be connected to the same type of charger, such as a Level 2 charge connection. In this embodiment, because the number of ports connected to power is not a multiple of the number of sub-packs (here, there are three ports connected to power and four sub-packs), a switching scheme must be used, similar to that in FIGS. 5A and 5B, above, to ensure even charging among the sub-packs. In the embodiment of FIGS. 6A and 6B, in Phase A (FIG. 6A), port 12A may be used to charge sub-pack 20A, port 12B may be used to charge sub-pack 20B and port 12C may be used to charge sub-packs 20C and 20D. In Phase B, because sub-packs 20C and 20D may charge at about half the speed of sub-packs 20A and 20B, ports 12A may be used to provide a "catch-up" charge to sub-pack 20D and port 12C may be used to provide a "catch-up" charge to sub-pack 20C. The system 30 can switch between Phase A and Phase B to provide a substantially even charge among the sub-packs 20A through 20D.

Figure 7A:
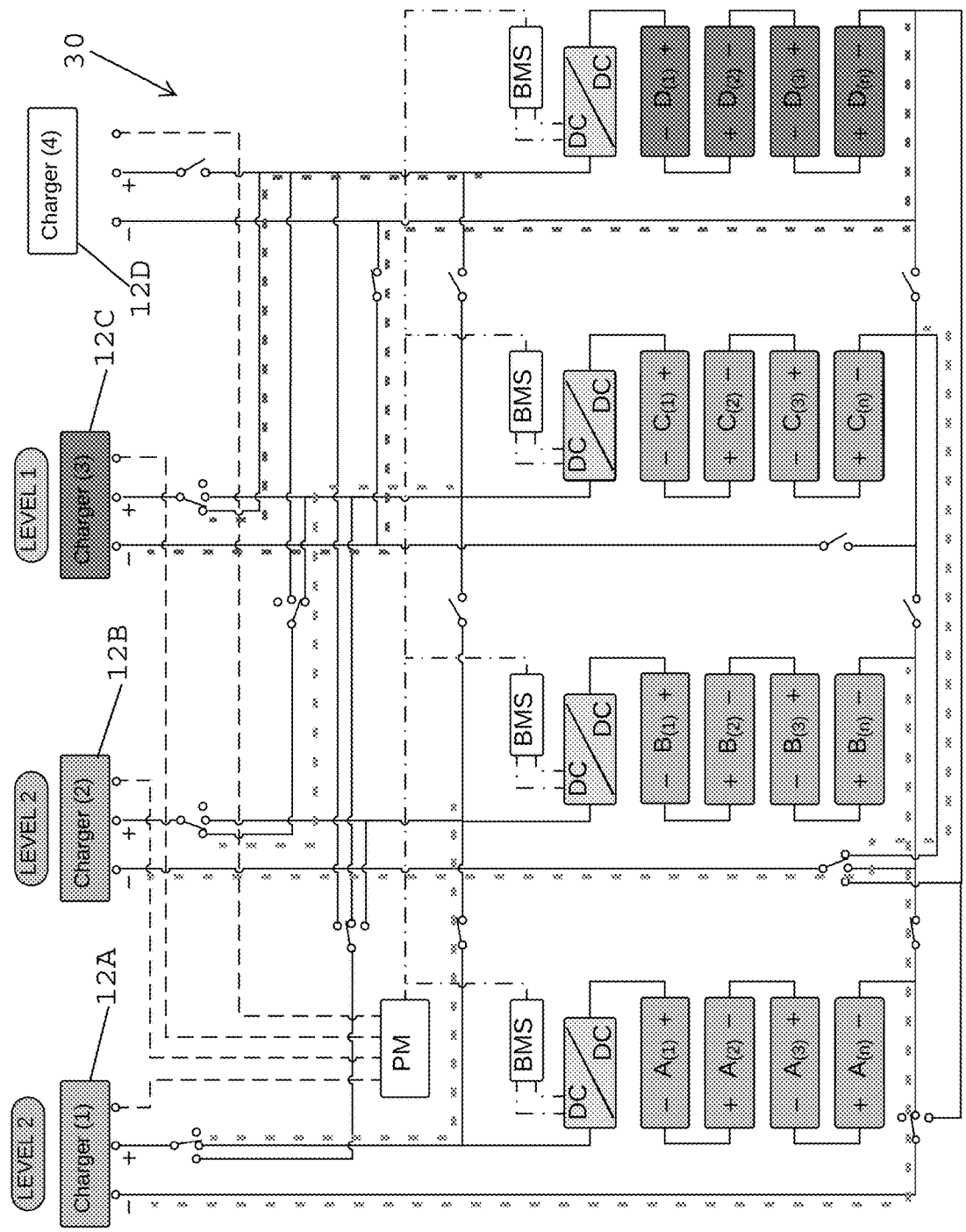
FIG. 7A illustrates the simplified schematic diagram of FIG. 3 with three chargers selectively connected as shown for Phase A of the charge cycle, where two chargers are Level 2 and one is Level 1.
Figure 7B:
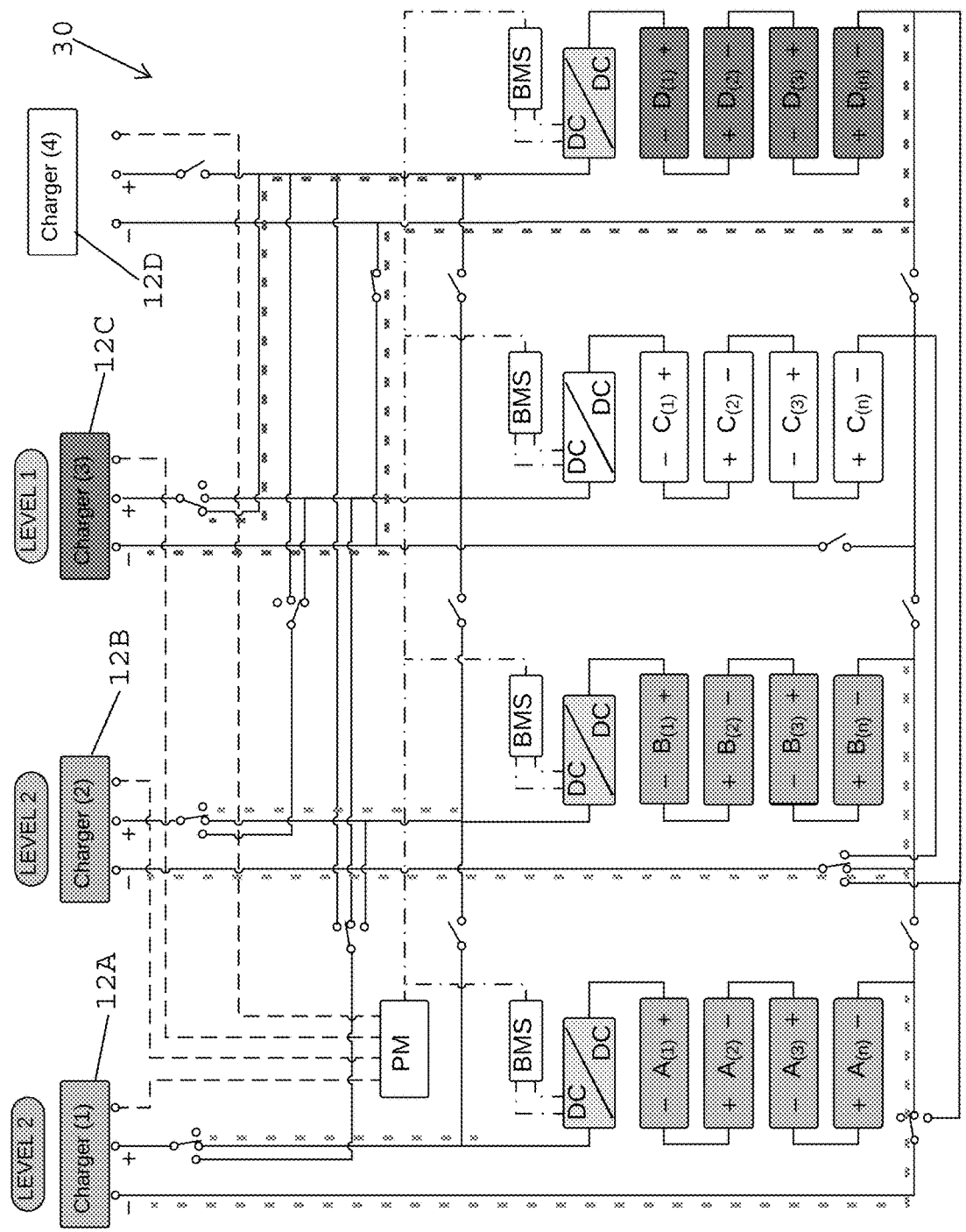
FIG. 7B illustrates the simplified schematic diagram of FIG. 7A with three chargers selectively connected as shown for Phase B of the charge cycle.
Figure 7C:
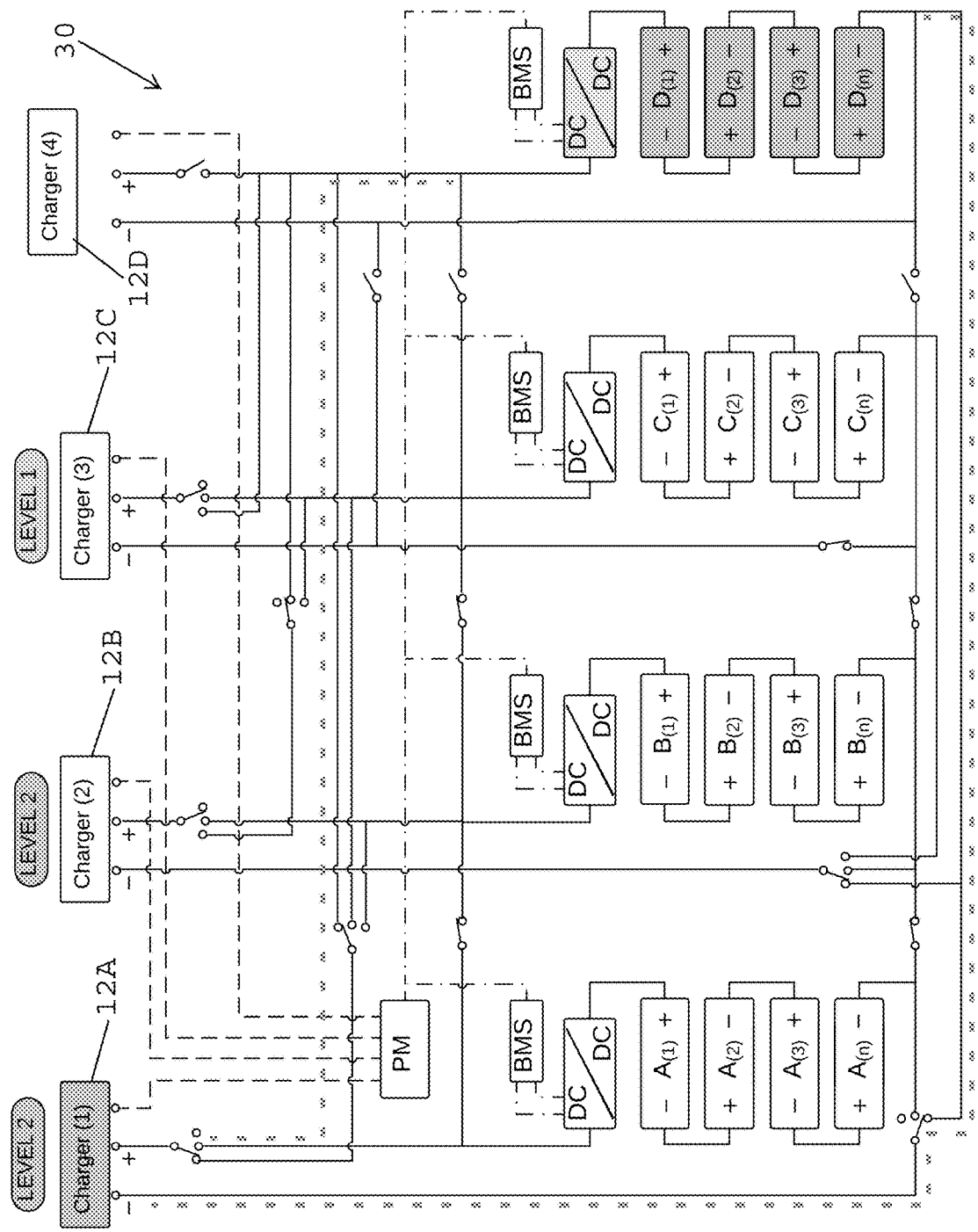
FIG. 7C illustrates the simplified schematic diagram of FIG. 7A with three chargers selectively connected as shown for Phase C of the charge cycle.

Referring to FIGS. 7A through 7C, to provide a substantially even charge among the sub-packs 20A through 20D, when three ports 12A, 12B, 12C are connected to power, but the power levels are different (such as Level 2 power connection at port 12A, Level 2 power connection at port 12B and Level 1 power connection at port 12C), a switching scheme with three phases, Phase A, Phase B and Phase C may be provided. In Phase A, port 12A may be used to charge sub-packs 20A and 20B, port 12B may be used to charge sub-pack 20C and port 12C may be used to charge sub-pack 20D. In Phase B, port 12A may be used to charge sub-pack 20A, port 12B may be used to charge sub-pack 20B and port 12C may be used to charge sub-pack 20D. In Phase C, port 12A may be used to charge sub-pack 20D. The Phases may be switched to provide a substantially even charge among the sub-packs 20A through 20D.

Figure 8A:
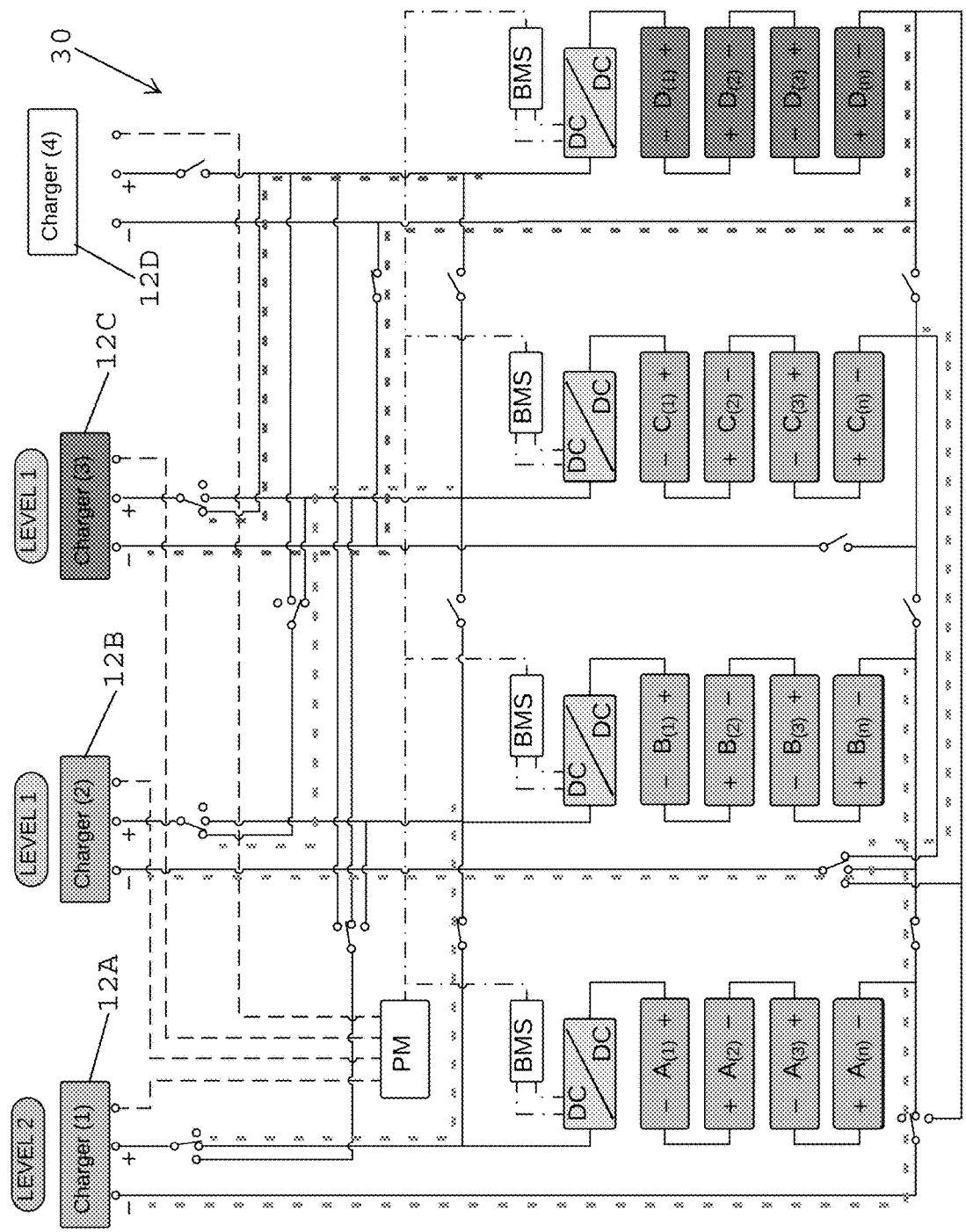
FIG. 8A illustrates the simplified schematic diagram of FIG. 3 with three chargers selectively connected as shown for Phase A of the charge cycle, where one charger is Level 2 and two are Level 1.
Figure 8B:
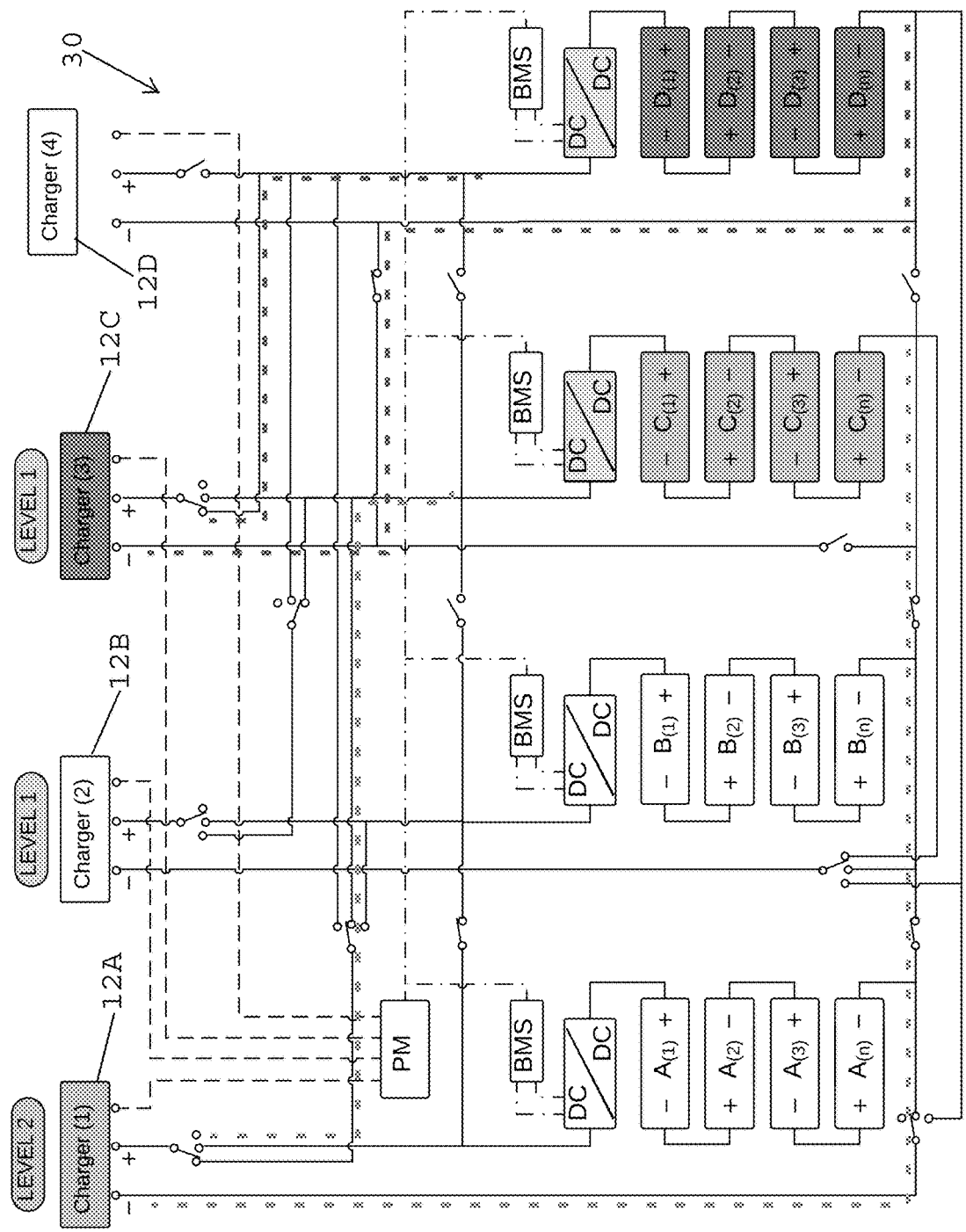
FIG. 8B illustrates the simplified schematic diagram of FIG. 8A with three chargers selectively connected as shown for Phase B of the charge cycle.
Figure 8C:
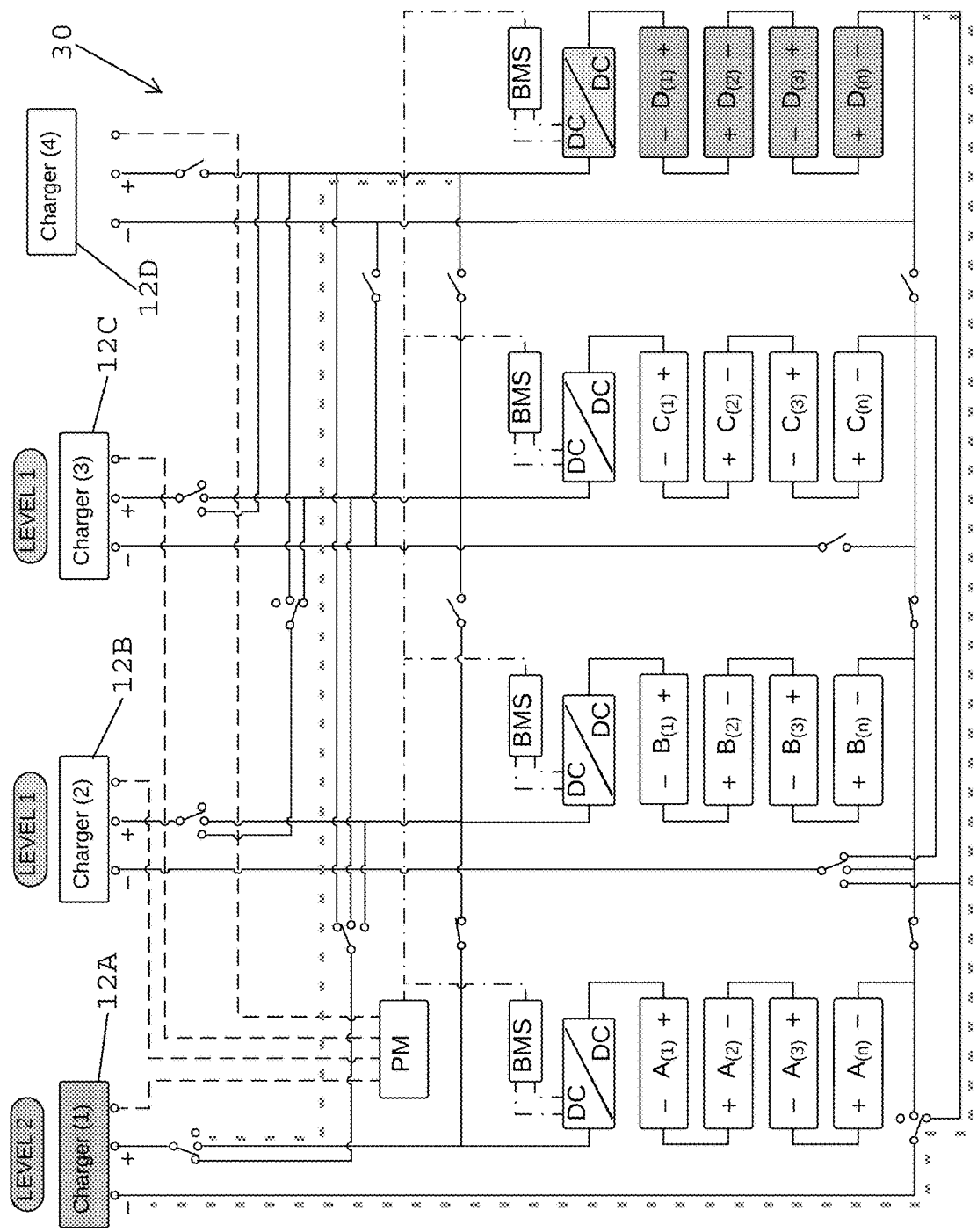
FIG. 8C illustrates the simplified schematic diagram of FIG. 8A with three chargers selectively connected as shown for Phase C of the charge cycle.

FIGS. 8A through 8C provide another example of three ports 12A, 12B, 12C being supplied power, where Level 2 power is provided at port 12A, Level 1 power is provided at port 12B and Level 1 power is provided at port 12C. In Phase A, port 12A may be used to charge sub-packs 20A and 20B, port 12B may be used to charge sub-pack 20C and port 12C may be used to charge sub-pack 20D. In Phase B, port 12A may be used to charge sub-pack 20C and port 12C may be used to charge sub-pack 20D. In Phase C, port 12A may be used to charge sub-pack 20D. The Phases may be switched to provide a substantially even charge among the sub-packs 20A through 20D.

FIGS. 9 through 12D provide examples where power may be provided to all four ports 12A through 12D.

Figure 9:
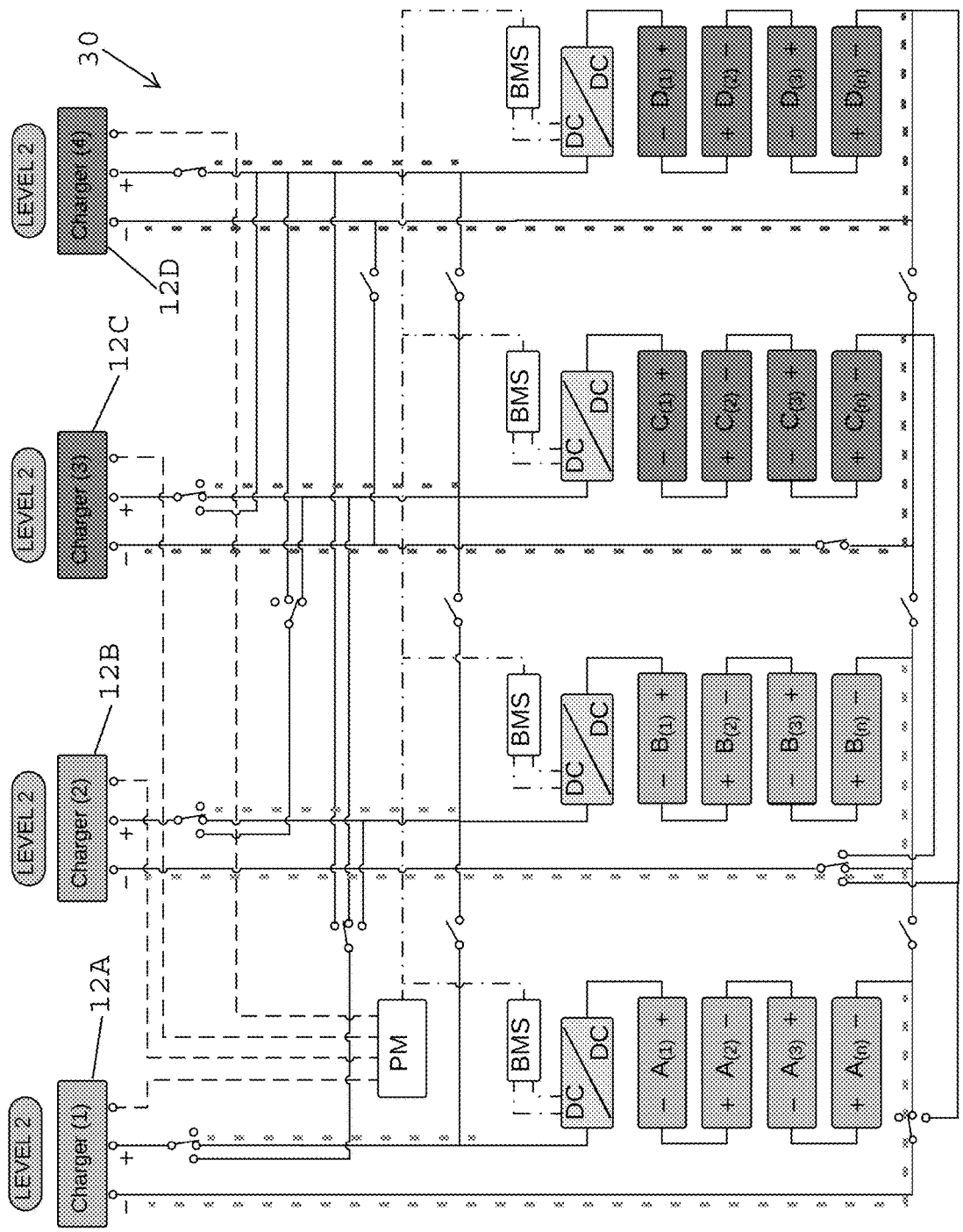
FIG. 9 illustrates the simplified schematic diagram of FIG. 3 with four chargers selectively connected as shown, where each charger is the same type (Level 2)

Referring to FIG. 9, the same power, such as a Level 2 power connection, may be provided to each of ports 12A through 12D. In this embodiments, each port 12A through 12D can charge sub-packs 20A through 20D, respectively. In this embodiments, the battery may charge about four times faster than the embodiment shown in FIG. 3.

Figure 10A:
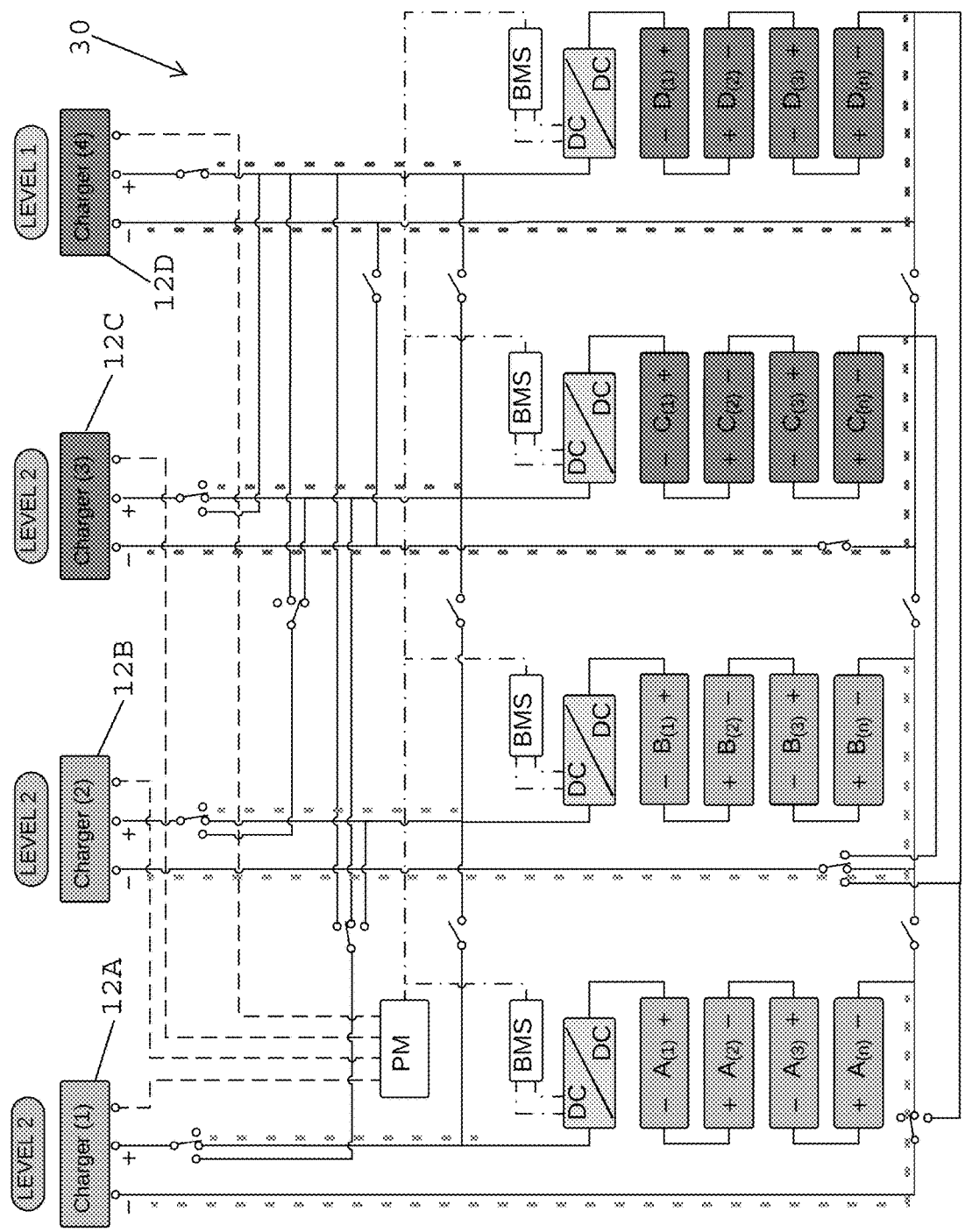
FIG. 10A illustrates the simplified schematic diagram of FIG. 3 with four chargers selectively connected as shown for Phase A of the charge cycle, where three chargers are Level 2 and one is Level 1.
Figure 10B:
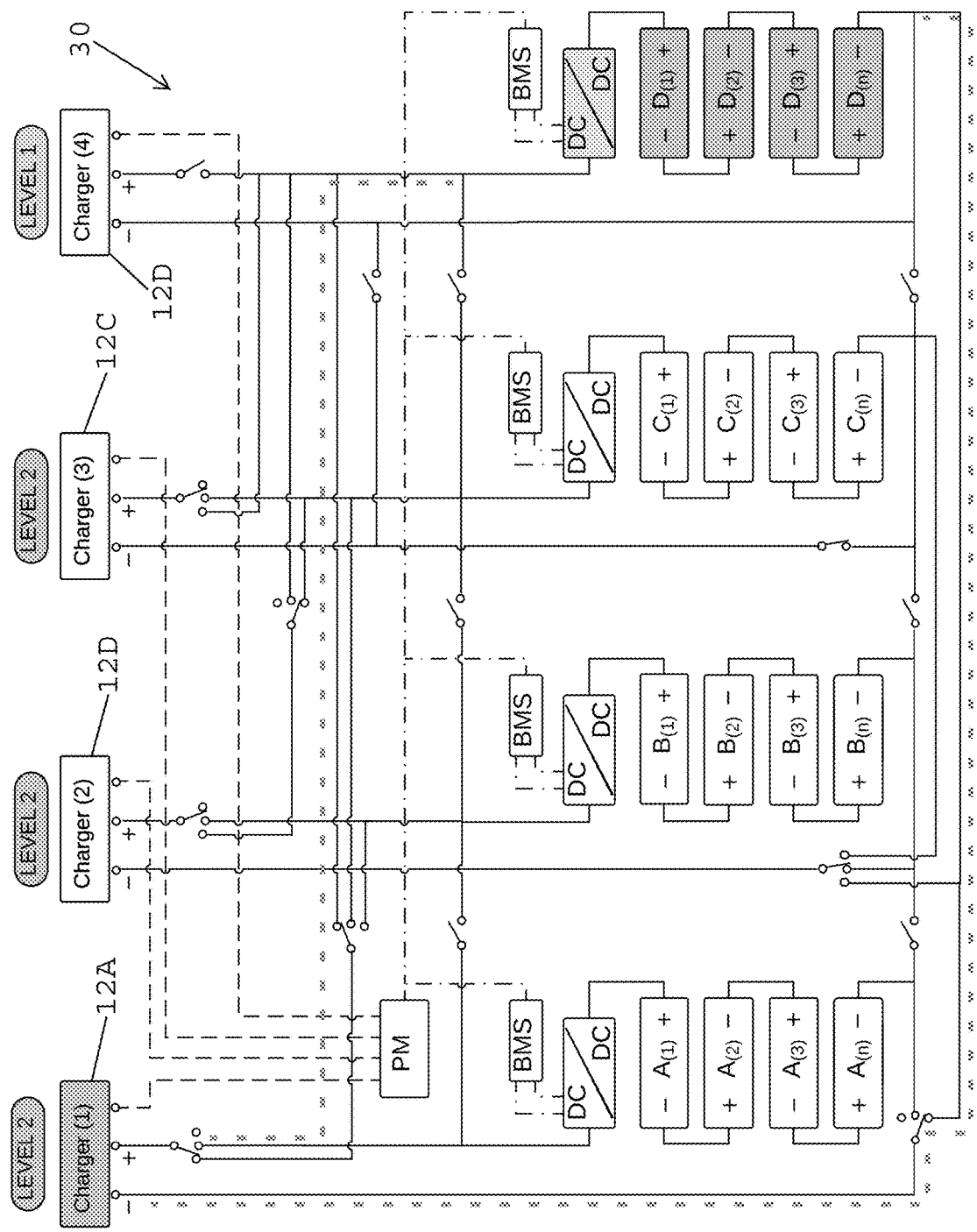
FIG. 10B illustrates the simplified schematic diagram of FIG. 10A with four chargers selectively connected as shown for Phase B of the charge cycle.

FIGS. 10A and 10B illustrate an example where there are three power sources of one type and one power source of another type connected to ports 12A through 12D. In this embodiments, port 12A may receive a Level 2 power connection, port 12B may receive a Level 2 power connection, port 12C may receive a Level 2 power connection and port 12D may receive a Level 1 power connection. To provide substantially even charging among the sub-packs 20A through 20D, a switching scheme between Phase A and Phase B may be provided. In Phase A, port 12A may be connected to sub-pack 20A, port 12B may be connected to sub-pack 20B, port 12C may be connected to sub-pack 20C and port 12D may be connected to port 20D. In Phase B, port 12A may be connected to sub-pack 20D to provide a "catch-up" charge thereto. The Phases may be switched to provide a substantially even charge among the sub-packs 20A through 20D.

Figure 11A:
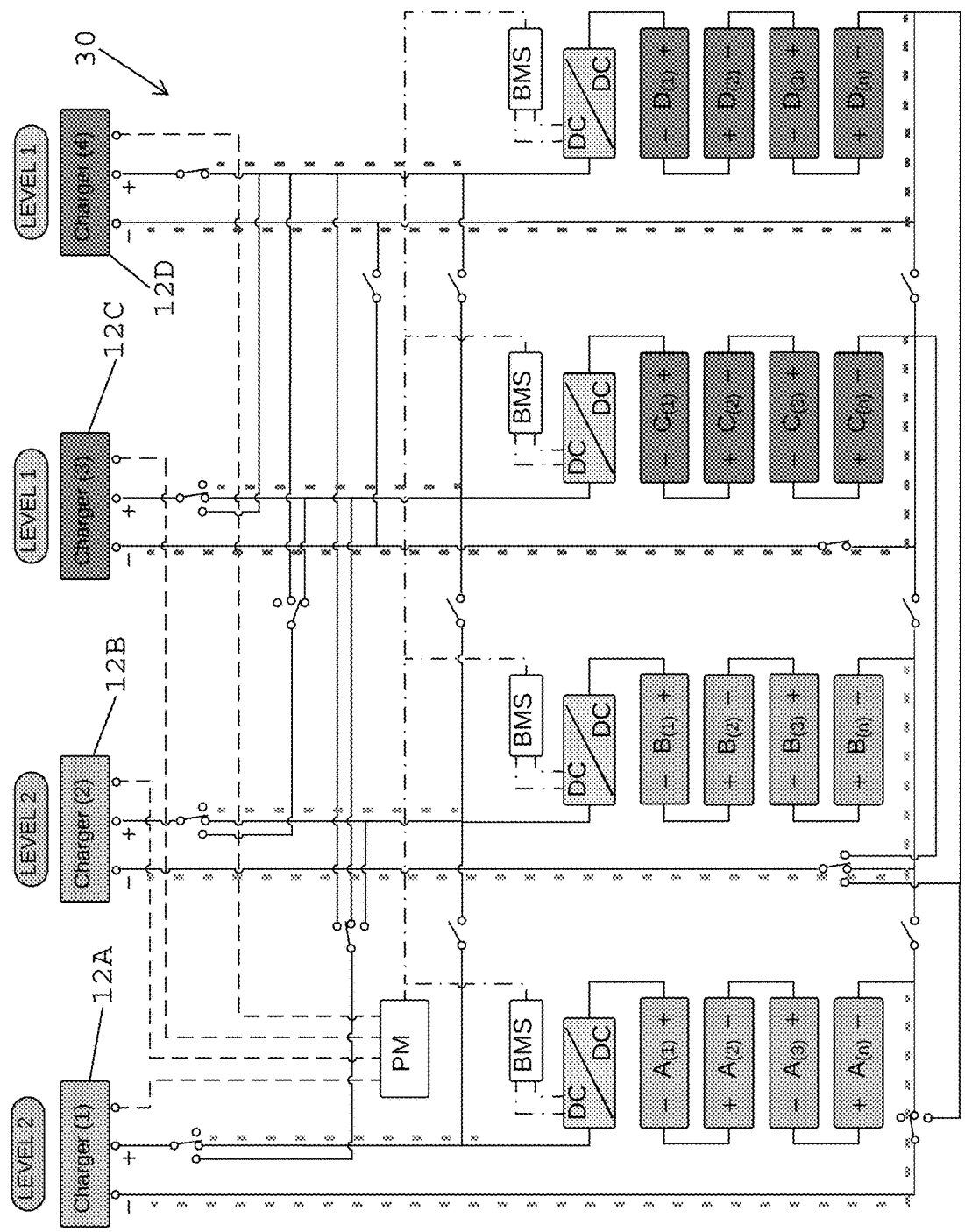
FIG. 11A illustrates the simplified schematic diagram of FIG. 3 with four chargers selectively connected as shown for Phase A of the charge cycle, where two chargers are Level 2 and two are Level 1.
Figure 11B:
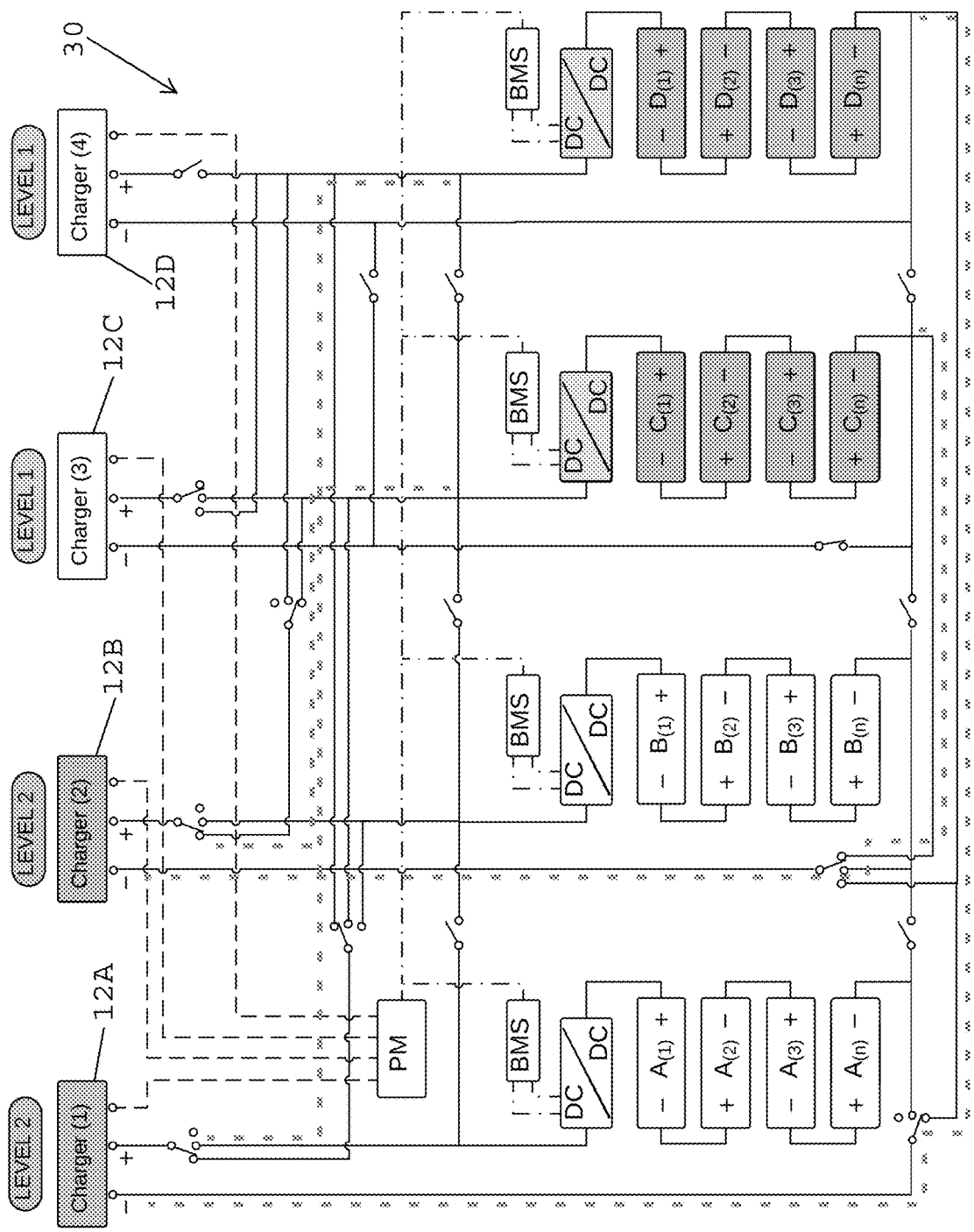
FIG. 11B illustrates the simplified schematic diagram of FIG. 11A with four chargers selectively connected as shown for Phase B of the charge cycle.
Figure 12A:
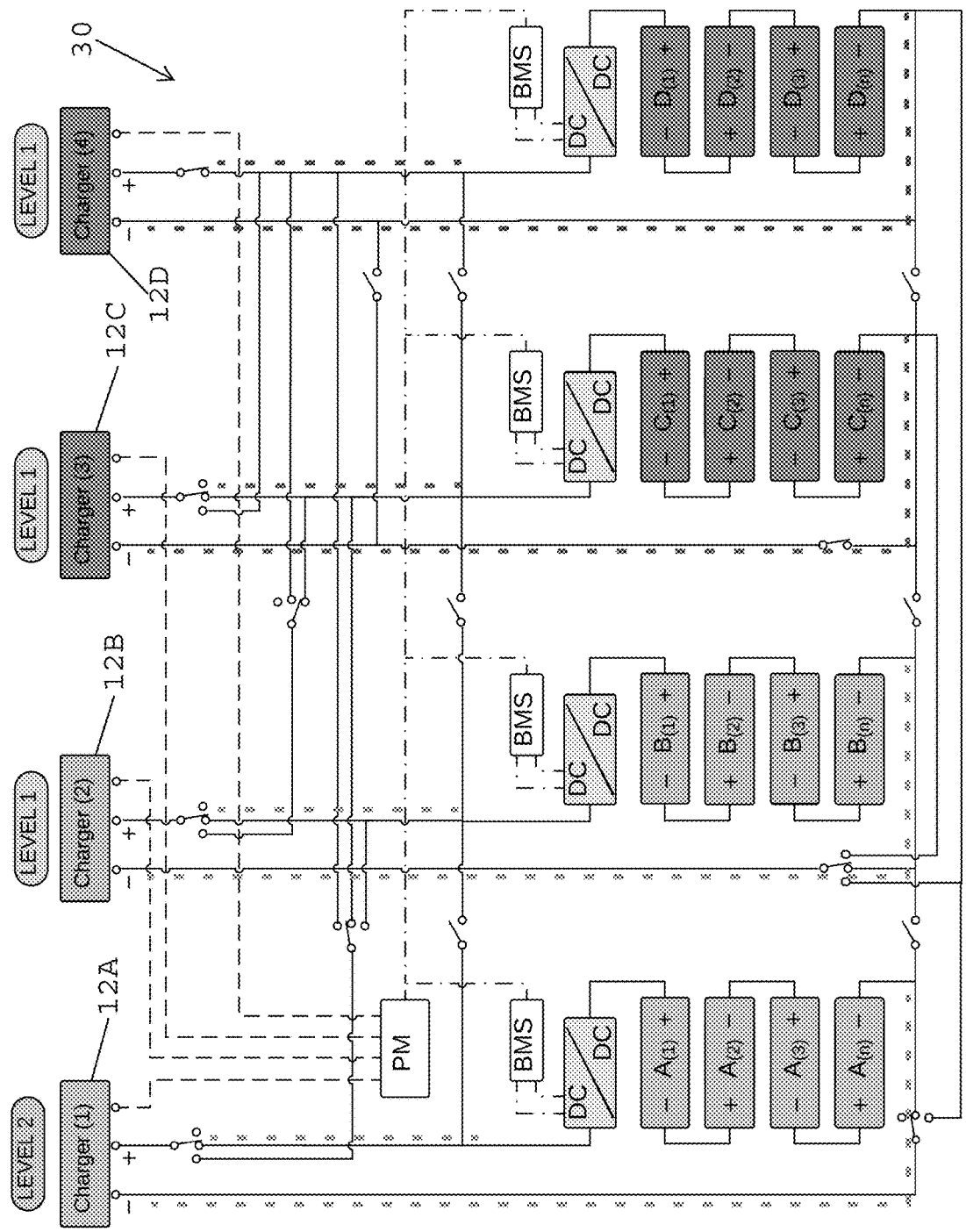
FIG. 12A illustrates the simplified schematic diagram of FIG. 3 with four chargers selectively connected as shown for Phase A of the charge cycle, where one charger is Level 2 and three are Level 1.
Figure 12B:
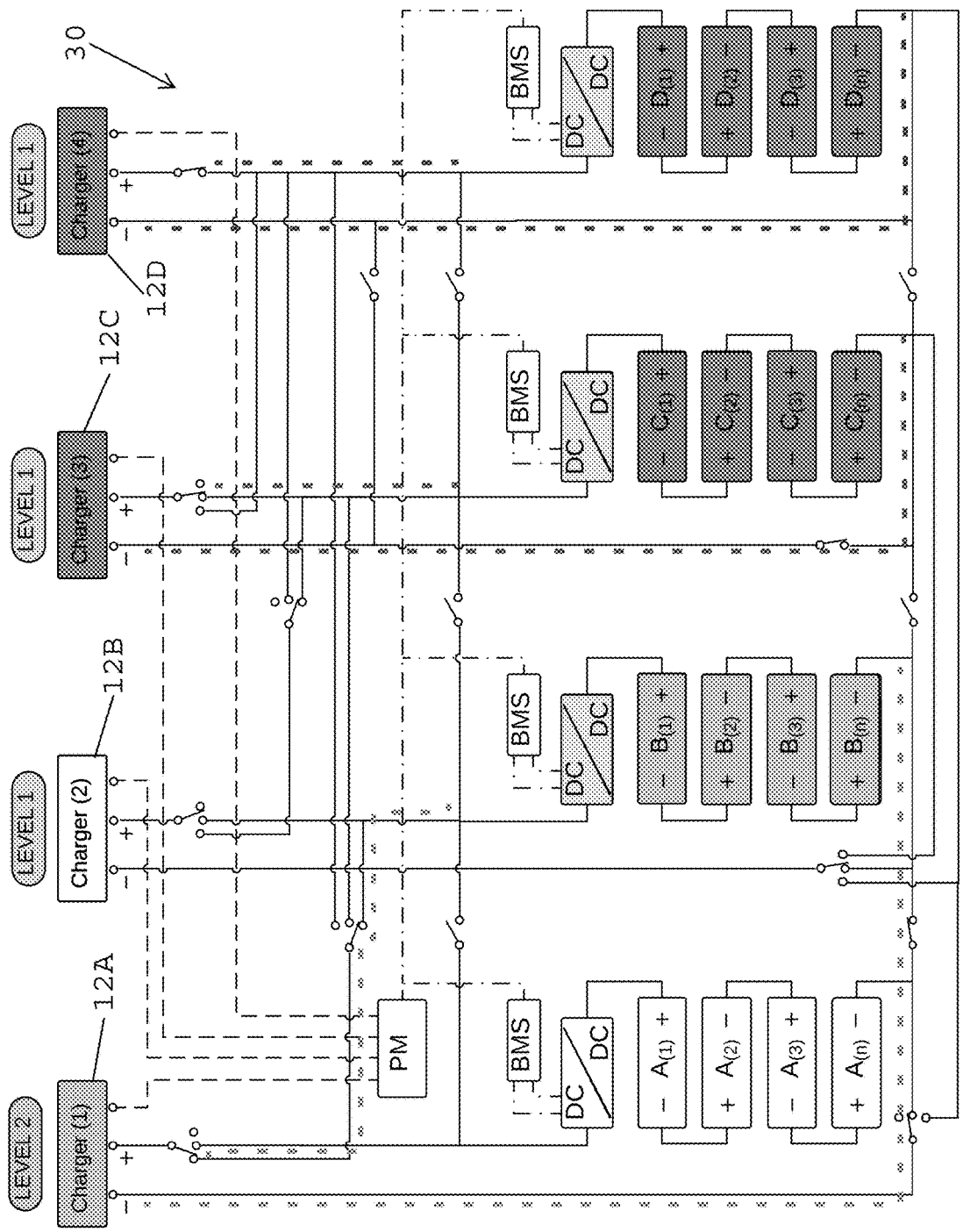
FIG. 12B illustrates the simplified schematic diagram of FIG. 12A with four chargers selectively connected as shown for Phase B of the charge cycle.
Figure 12C:
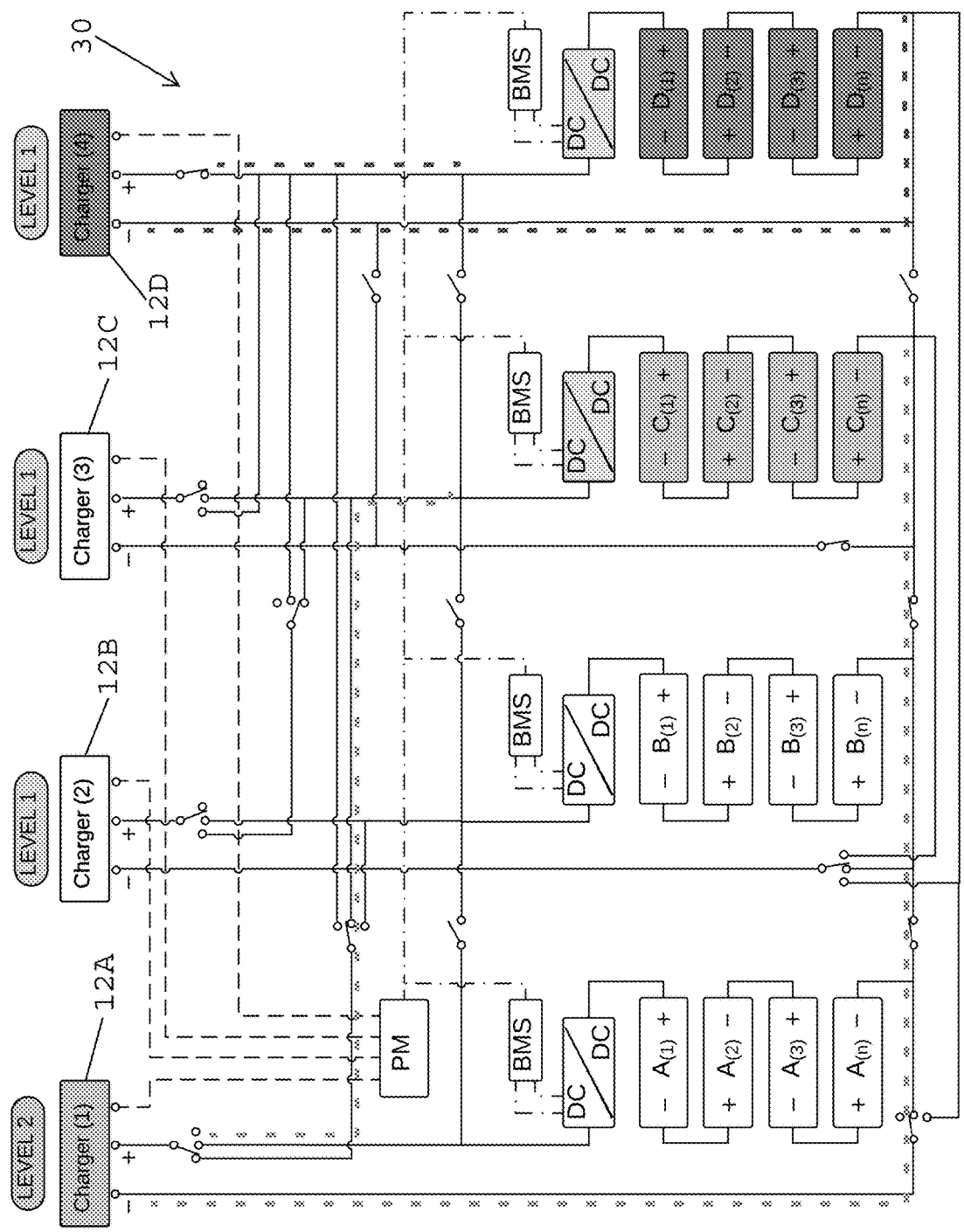
FIG. 12C illustrates the simplified schematic diagram of FIG. 12A with four chargers selectively connected as shown for Phase C of the charge cycle.
Figure 12D:
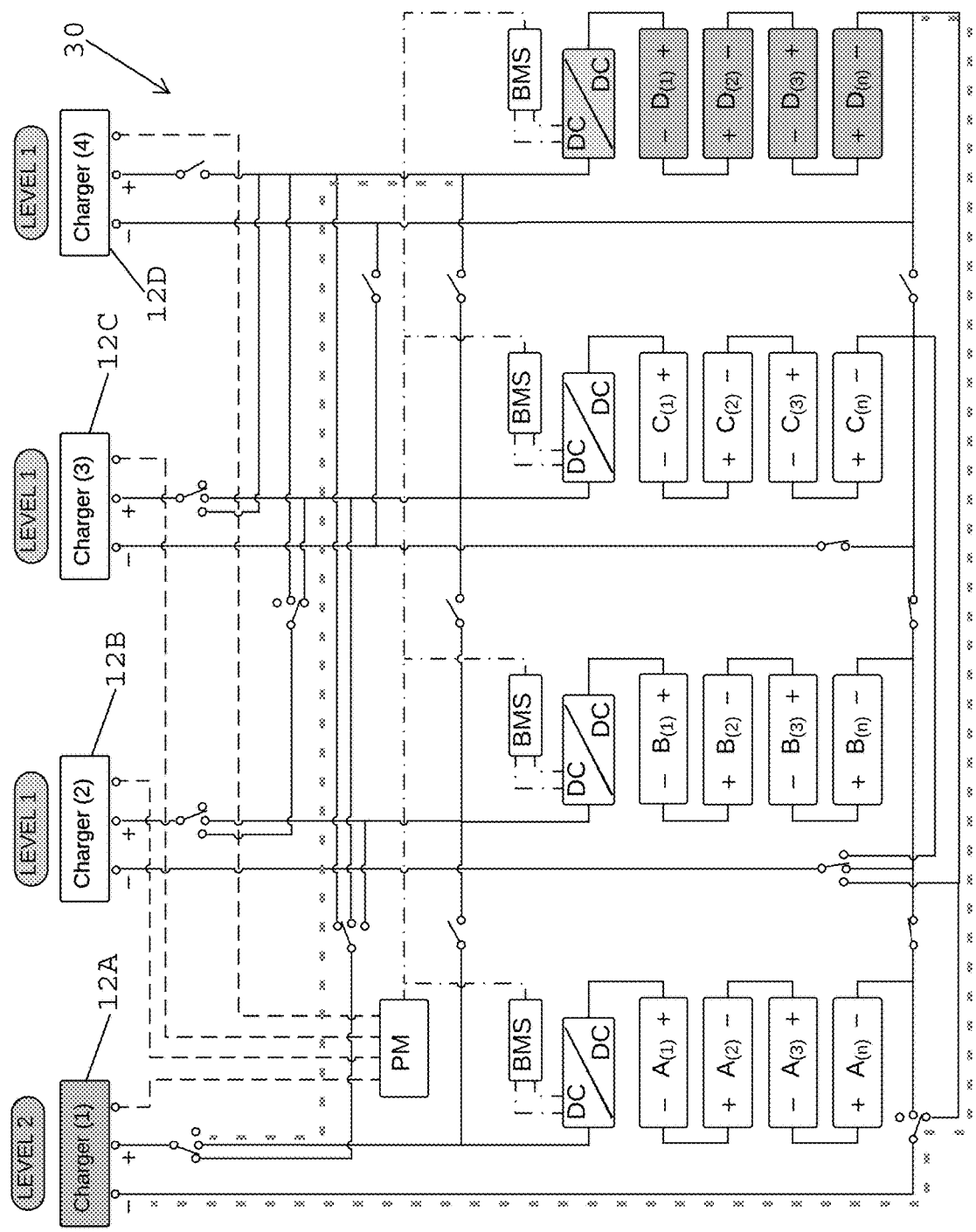
FIG. 12D illustrates the simplified schematic diagram of FIG. 12A with four chargers selectively connected as shown for Phase D of the charge cycle.

FIGS. 11A and 11B illustrate an example where there are two power sources of one type and two power sources of another type connected to ports 12A through 12D. In this embodiments, port 12A may receive a Level 2 power connection, port 12B may receive a Level 2 power connection, port 12C may receive a Level 1 power connection and port 12D may receive a Level 1 power connection. To provide substantially even charging among the sub-packs 20A through 20D, a switching scheme between Phase A and Phase B may be provided. In Phase A, port 12A may be connected to sub-pack 20A, port 12B may be connected to sub-pack 20B, port 12C may be connected to sub-pack 20C and port 12D may be connected to port 20D. In Phase B, port 12A may be connected to sub-pack 20C and port 12B may be connected to sub-pack 20D to provide a "catch-up" charge thereto. The Phases may be switched to provide a substantially even charge among the sub-packs 20A through 20D.

FIGS. 12A through 12D illustrate an example where there are three power sources of one type and one power source of another type connected to ports 12A through 12D. In this embodiments, port 12A may receive a Level 2 power connection, port 12B may receive a Level 1 power connection, port 12C may receive a Level 1 power connection and port 12D may receive a Level 1 power connection. To provide substantially even charging among the sub-packs 20A through 20D, a switching scheme between Phase A, Phase B, Phase C and Phase D may be provided. In Phase A, port 12A may be connected to sub-pack 20A, port 12B may be connected to sub-pack 20B, port 12C may be connected to sub-pack 20C and port 12D may be connected to port 20D. In Phase B, port 12A may be connected to sub-pack 20B, port 12C may be connected to sub-pack 20C and port 12D may be connected to sub-pack 20D. In Phase C, port 12A may be connected to sub-pack 20C and port 12D may be connected to sub-pack 20D. In phase D, port 12A may be connected to sub-pack 20D. The Phases may be switched to provide a substantially even charge among the sub-packs 20A through 20D.

The above provide specific examples of switching schemes to provide an even charge among a plurality of sub-packs for the battery. Other schemes are contemplated within the scope of the present invention, provided that, at full charge, the state of charge of each of the sub-packs 20A through 20D may be substantially the same. As used above, the state of charge may be determined to be "substantially the same" among the sub-packs when a variation in the voltage between two of the sub-packs may be from zero to about +/−0.5 V DC, typically from zero to about +/−0.2 V DC.

Figure 13:
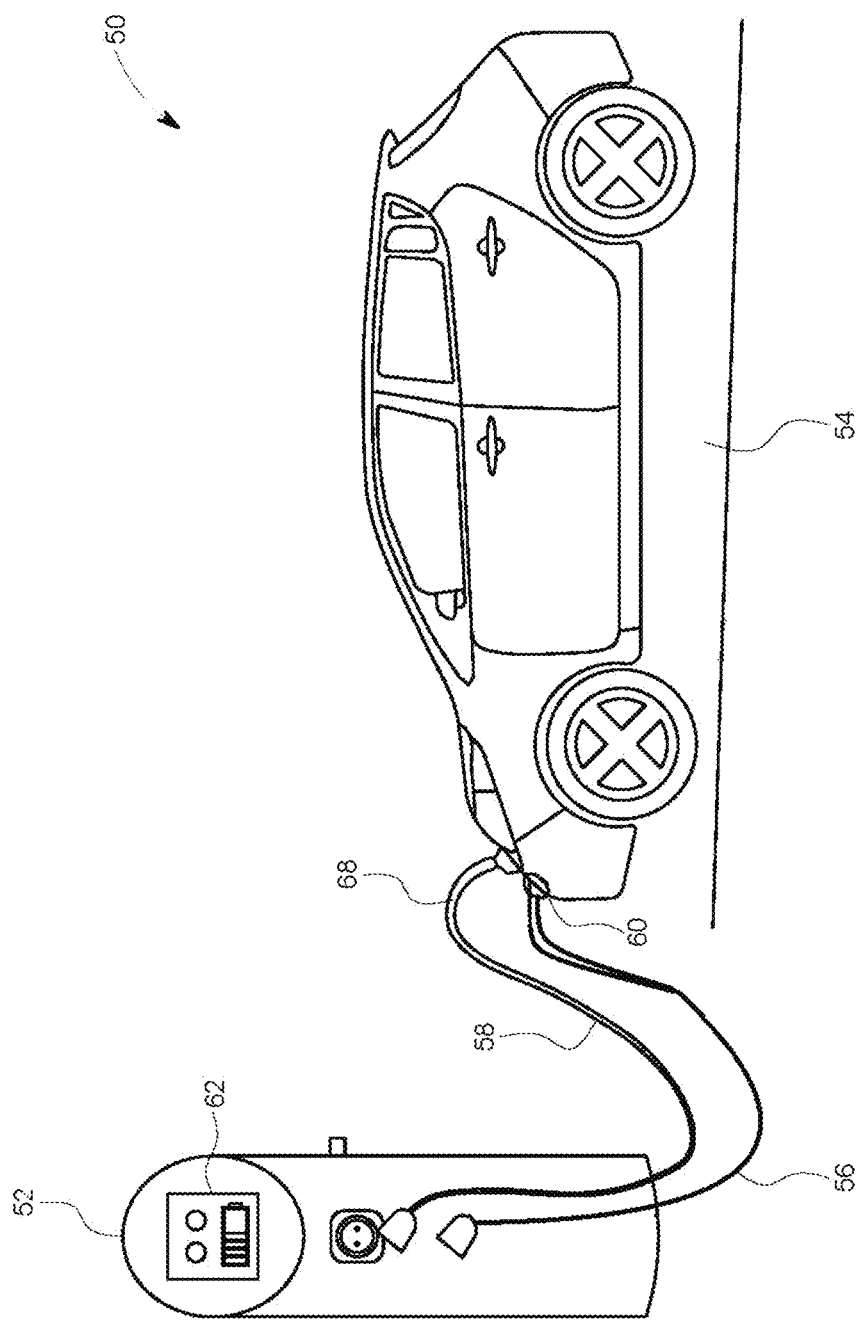
FIG. 13 illustrates a view of an electric vehicle charging stall where two lines from a single charging stall are available at the charging station for connection to the electric vehicle.
Figure 14:
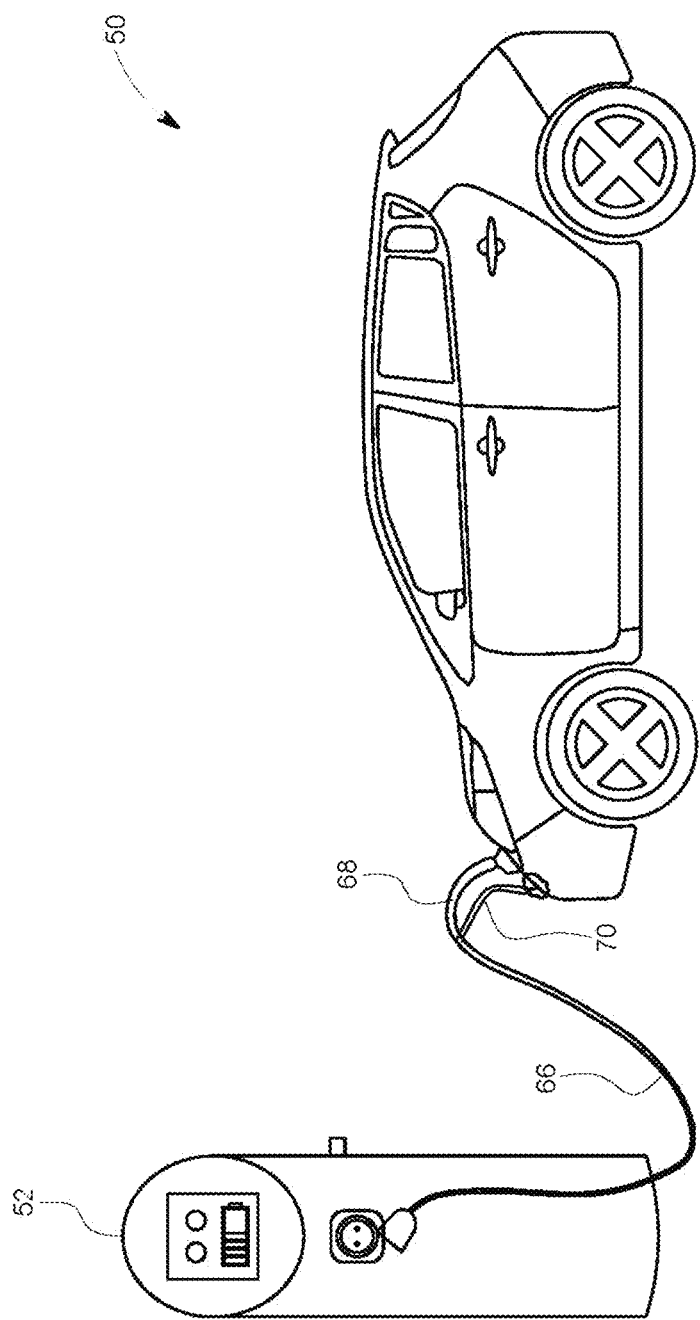
FIG. 14 illustrates a view of an electric vehicle charging stall where a single consolidated line from a charging stall at a charging station has multiple connectors for attachment to an electric vehicle.

Referring now to FIGS. 13 and 14, a single charging station 52 at a single charging stall 54 for an electric vehicle 50 can have the ability to provide more than one charging connector 60 to the vehicle 50. In FIG. 13, there are two charging lines, a first charging line 56 and a second charging line 58 extending from the charging station 52. The charging lines 56, 58 are configured to provide simultaneous power output to two ports of the electric vehicle 50. In FIG. 14, there is a single charging line 66 extending from the charging station 52, but this single charging line 66 include multiple power cables bundled therein, such that, near an end of the single charging line 66, a first charging line 68 and a second charging line 70 can be present to provide simultaneous power output to two ports of the electric vehicle 50.

Figure 14A:
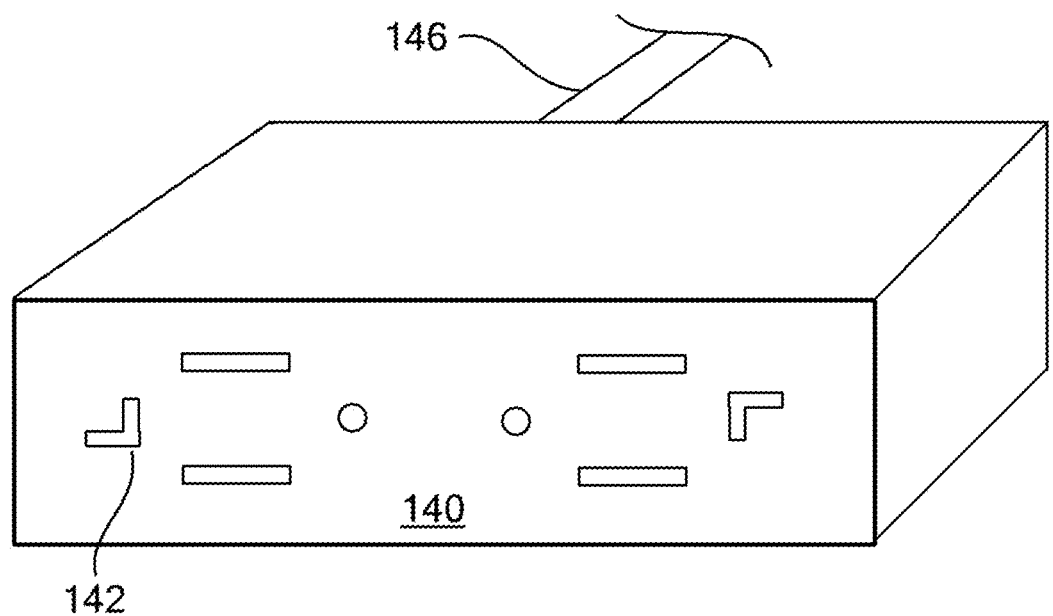
FIG. 14A illustrates an end view of a single connector providing power from bundled multiple charge lines from a single charging station, according to an exemplary embodiment of the present invention.
Figure 14B:
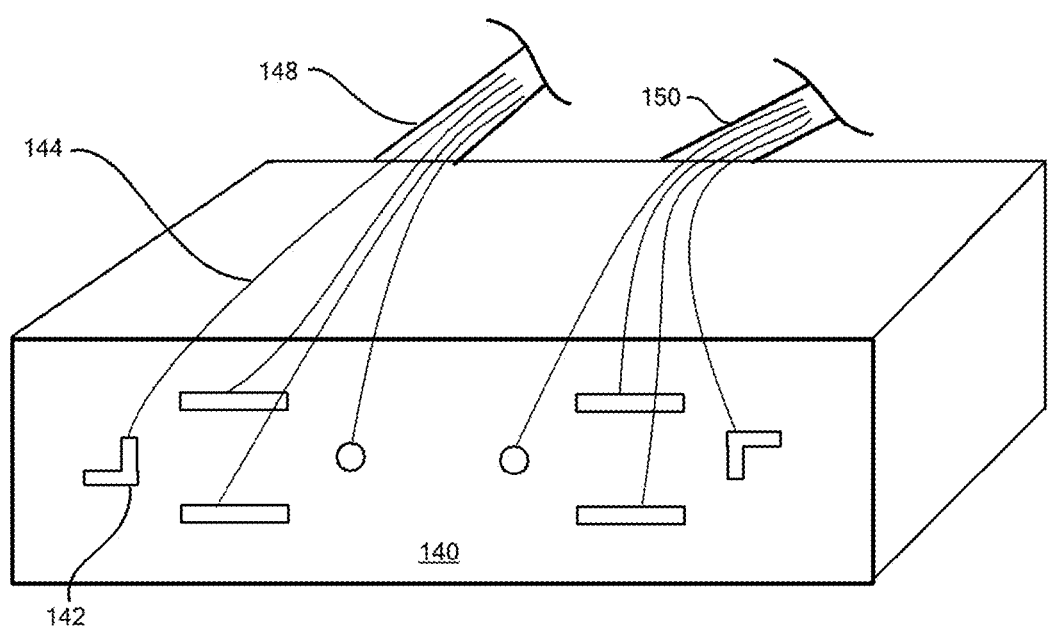
FIG. 14B illustrates an end view of the single connector of FIG. 14A powered from multiple separate charge lines from a single charging station, according to an exemplary embodiment of the present invention.

In some embodiments, the multiple cables in the single charging line 66 can terminate in a single connector, providing individual terminals 142 for each of the power cables bundled therein. FIG. 14A shows an example of a single connector 140 with multiple power cables bundled together in a single charging line 146 to provide power to the single connector 140. FIG. 14B shows the single connector 140 having multiple charging lines 148, 150 terminating thereto. FIG. 14B shows, for illustrative purposes, the individual wires 144, however, such wires 144 would be internal to a housing of the single connector 140 and would not be visible. While two power lines are shown connected to the single connector 140, any number of power cables may terminate at a single connector. The single connector may take various configurations. For example, FIGS. 14A and 14B illustrate an example of end-to-end NEMA 14-30 connectors in a single connector. Other connector configurations, either known or unique, may be used in the single connector. Further, depending on current electric codes, the neutral and/or ground lines may be shared for each of the bundled power cables.

Each of the lines, whether terminating at a single connector or at separate connectors, may carry alternating current (AC), direct current (DC) or one line may carry AC while another line carries DC. Typically, the type of current provided can be determined by the type of connector at the end of the line. Each of the lines may be configured to provide an equal rate of charge at each connector or may be configured to provide different rates of charge at each connector.

In some embodiments, the charging cable(s) may be manual, hand-operated electric plugs. In other embodiments, the charging cable(s) may be robotic or mechanically-operated electrical plugs. In the later embodiment, the robotic or mechanically-operated electrical plugs may be completely automated, where the system can detect the location of one or more ports on a device and move the plugs to be connected thereto.

The charging station 52 can include a display 62 that can allow the user to control the charging and/or see the power draw at each of the charging lines, such as charging lines 56, 58 or charging lines 68, 70. The display 62 can include a selection for a power level at each charging line, if available and may show time to full charge, total time charged, total cost, or the like.

While the Figures show two charging plugs available from a single charging station for a single electric vehicle parked in a single stall, there could be more than two charging plugs available at the single charging station for a single electric vehicle. This design allows a person to charge their electric vehicle, having multiple charging ports, with more than one charging line without taking the charging line of an adjacent stall.

Figure 15:
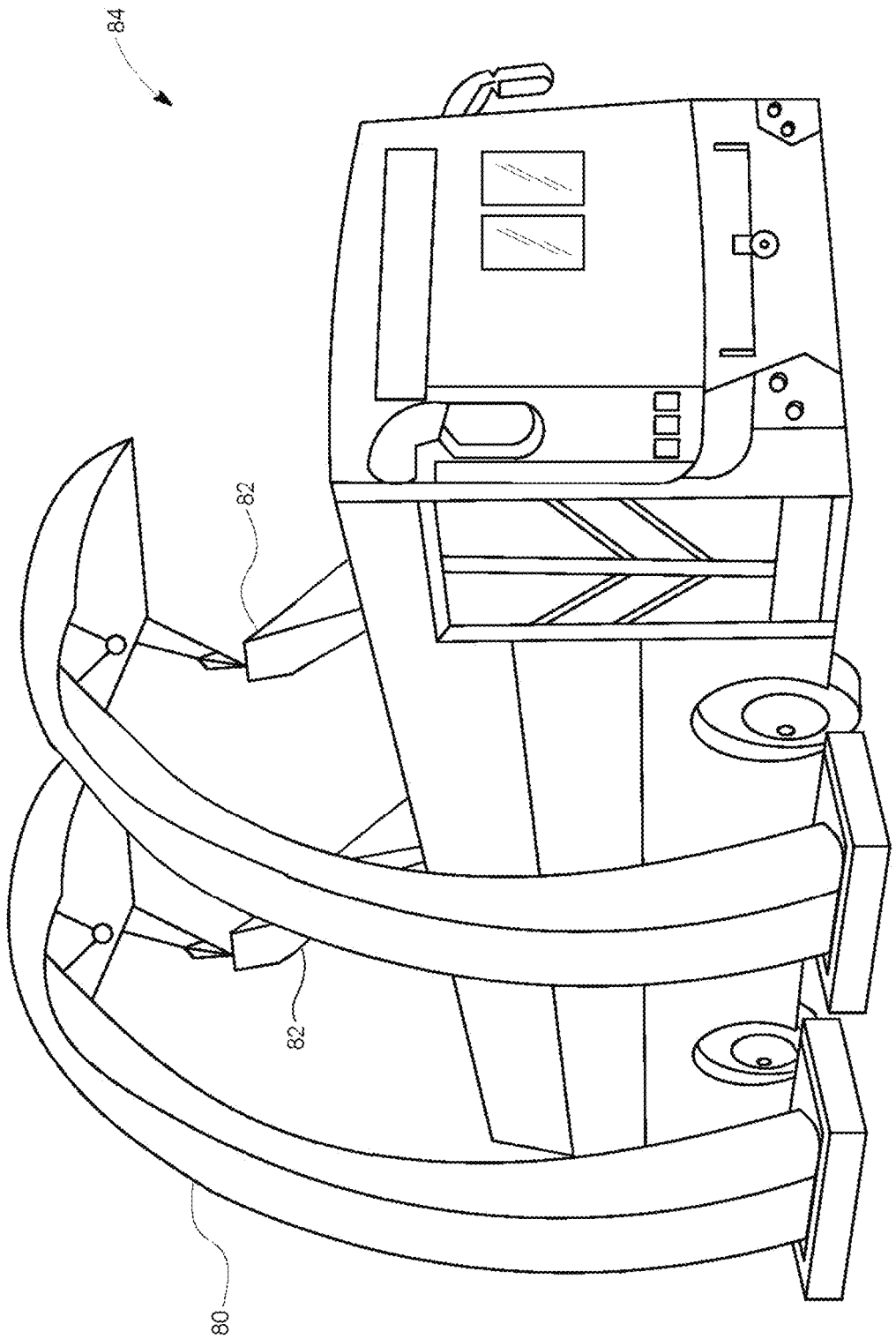
FIG. 15 illustrates a pantograph charging system used with an electric vehicle according to an exemplary embodiment of the present invention.

Referring to FIG. 15, a pantograph charging system 80 may be used to charge an electric vehicle 84 via a charging connection 82. While two charging connections 82 are shown, like the embodiments above, multiple charging connections 82 may provide power to multiple battery sub-packs simultaneously. In some embodiments, the charging connections 82 may not be present and the system 80 may operate as a wireless charging station. The pantograph charging system and/or wireless charging system may be used instead of or in addition to the wired charging systems as described above.

Figure 16:
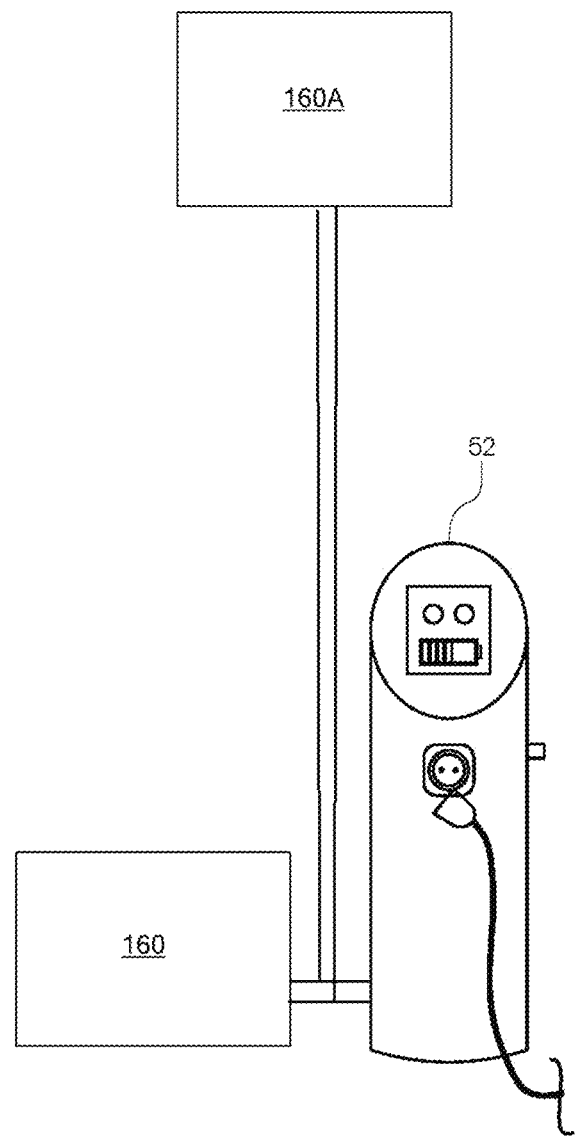
FIG. 16 illustrates an energy storage device used in conjunction with a battery charging station, according to an exemplary embodiment of the present invention.

Referring to FIG. 16, a home owner or a public charging station may need to draw power from an electrical energy storage system 160 (e.g., Tesla Powerwall battery, Tesla Powerpack battery, or the like) because the electrical grid may not be able to deliver the large amount of power needed to fast charge a device with multiple power cables or to fast charge multiple EVs at the same time. The storage system 160 would serve to provide local reserve power, and a buffer for the electrical grid, to meet the power spike in usage demand when multiple power draws are occurring concurrently. The electrical energy storage system 160 may be recharged via the electrical grid at an acceptable rate of power consumption while the EVs are being charged and/or when no EVs are being charged. Therefore, in some embodiments, power can be provided to the battery of the EV by an electrical energy storage system. In some embodiments, the electrical energy storage system is operable to be recharged via the electrical grid at an acceptable rate of power consumption while one or more EVs are being charged or when no EVs are being charged. In some embodiments, alternative energy devices, such as solar or wind-powered devices, may be used to charge the energy storage system 160.

In some embodiments, the energy storage system 160 may be located on the premises of the battery charging system (as shown with energy storage system 160) or may be located off the premises of the battery charging system (as shown with energy storage system 160A). In some embodiments, the energy storage system 160 may be an electric vehicle, a stationary, non-mobile device, a non-electric vehicle mobile device, or the like.

In some embodiments, the battery charging station may receive power from the electrical device connected thereto. In some embodiments, an energy storage system, such as energy storage system 160 described above, may receive power from an electrical device connected to one of the multiple lines of the charging station.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A battery charging station for an electrical device, comprising:
   at least one stall for receiving the electrical device; and
   at least two electrical power charge cords or connectors at each of the at least one stall, wherein
   in a first mode of operation, the at least two electrical power charge cords or connectors each provide current simultaneously to the electrical device to enable a fast charge to the electrical device placed at each of the at least one stall via provided electrical power from the battery charging station or
   in a second mode of operation, one of the at least two electrical power charge cords or connectors provides current to an energy storage device via provided electrical power from the electrical device placed at each of the at least one stall.

2. The battery charging station of claim 1, wherein the electrical device is an electric vehicle.

3. The battery charging station of claim 1, wherein each of the at least two electrical power charge cords or connectors provides an equal rate of electrical charge power.

4. The battery charging station of claim 1, wherein the at least two electrical power charge cords or connectors provide at least two different rates of electrical charge power.

5. The battery charging station of claim 1, wherein each of the at least two electrical power charge cords or connectors provides either an alternating current (AC) electrical charge power, a direct current (DC) electrical charge power, or a combination thereof.

6. The battery charging station of claim 1, wherein the at least two electrical power charge cords are bundled together as a single power charge cord having an end connector comprising multiple individual electrical connections.

7. The battery charging station of claim 1, wherein the at least two electrical power charge cords are bundled together as a single power charge cord having more than one end connector with each connector comprising individual electrical connections.

8. The battery charging station of claim 1, wherein the at least two electrical power charge connectors are manual, hand-operated electrical plug devices.

9. The battery charging station of claim 1, wherein the at least two electrical power charge connectors are robotic, mechanized-operated electrical plug devices.

10. The battery charging station of claim 1 where the at least two electrical power charge connectors are either pantograph charging electrical devices or wireless charging electrical devices.

11. The battery charging station of claim 1 where the at least two electrical power charge connectors comprise a combination of either manual, hand-operated electrical plug devices; robotic, mechanized-operated electrical plug devices; pantograph charging electrical devices; or wireless charging electrical devices.

12. The battery charging station of claim 1 where the provided electrical power is provided at least partially by an electrical energy storage device, the electrical energy storage device being located on premises of the battery charging station or located off the premises of the battery charging station.

13. The battery charging station of claim 12, wherein the electrical energy storage device is either an electric vehicle, a stationary, non-mobile device, or a mobile device that is not considered an electric vehicle.

14. A battery charging station comprising:
    at least one stall; and
    at each stall, at least two electrical power charge cords or connectors that (1) each provide current simultaneously to an electrical device to provide electrical power to enable a fast charge to, or (2) receive a charge at an energy storage device, from the electrical device placed at the at least one stall, via one of the at least two electrical power charge cords or connectors.

15. The battery charging station of claim 14, wherein the provided electrical power is provided at least partially by an electrical energy storage device.

16. The battery charging station of claim 15, wherein the electrical energy storage device is located either on premises of the battery charging station or is located off the premises of the battery charging station.

17. The battery charging station of claim 15, wherein the electrical energy storage device is either an electric vehicle, a stationary, non-mobile device, or a mobile device that is not considered an electric vehicle.

18. The battery charging station of claim 14, wherein each of the at least two electrical power charge cords or connectors provides an equal rate of electrical charge power or wherein one or more of the at least two electrical power charge cords or connectors provide a different rate of electrical charge power.

19. The battery charging station of claim 14, wherein each of the at least two electrical power charge cords or connectors provides an either an alternating current (AC) electrical charge power or a direct current (DC) electrical charge power, or wherein both AC and DC electric charge power is separately provided by the at least two electrical power charge cords or connectors.

20. The battery charging station of claim 14, wherein the at least two electrical power charge cords are bundled together as a single power charge cord having an end connector with multiple individual electrical connections.

21. The battery charging station of claim 14, wherein the at least two electrical power charge connectors are either manual, hand-operated electrical plug devices, robotic, mechanized-operated electrical plug devices, pantograph charging electrical devices, wireless charging electrical devices, or combinations thereof.

* * * * *